(12) United States Patent
Ichikawa et al.

(10) Patent No.: US 9,595,382 B2
(45) Date of Patent: Mar. 14, 2017

(54) RESONANCE COIL, ELECTRIC POWER TRANSMISSION DEVICE, ELECTRIC POWER RECEIVING DEVICE, AND ELECTRIC POWER TRANSMISSION SYSTEM

(75) Inventors: Shinji Ichikawa, Toyota (JP);
Nobuyoshi Kikuma, Nagoya (JP);
Masafumi Kadoi, Chita (JP)

(73) Assignees: TOYOTA JIDOSHA KABUSHIKI KAISHA, Toyota (JP); NATIONAL UNIVERSITY CORPORATION NAGOYA INSTITUTE OF TECHNOLOGY, Nagoya (JP)

( * ) Notice: Subject to any disclaimer, the term of this patent is extended or adjusted under 35 U.S.C. 154(b) by 652 days.

(21) Appl. No.: 13/981,937

(22) PCT Filed: Feb. 23, 2012

(86) PCT No.: PCT/IB2012/000320
§ 371 (c)(1),
(2), (4) Date: Jul. 26, 2013

(87) PCT Pub. No.: WO2012/114191
PCT Pub. Date: Aug. 30, 2012

(65) Prior Publication Data
US 2013/0320774 A1    Dec. 5, 2013

(30) Foreign Application Priority Data

Feb. 25, 2011 (JP) .................................. 2011-039923

(51) Int. Cl.
*H01F 27/42* (2006.01)
*H01F 37/00* (2006.01)
(Continued)

(52) U.S. Cl.
CPC ............ *H01F 38/14* (2013.01); *B60L 11/182* (2013.01); *H02J 7/00* (2013.01); *H02J 17/00* (2013.01);
(Continued)

(58) Field of Classification Search
CPC ... H04B 5/00; H02J 5/005; H02J 17/00; H02J 7/025; H02J 5/00; H01F 38/14; B60L 11/182
(Continued)

(56) References Cited

U.S. PATENT DOCUMENTS

| 6,561,022 B1 * | 5/2003 | Doyle | ................. A47J 31/4457 324/207.15 |
| 2005/0007067 A1 * | 1/2005 | Baarman | ................... H01F 5/02 320/108 |

(Continued)

FOREIGN PATENT DOCUMENTS

| JP | A-2003-79597 | 3/2003 |
| JP | A-2008-67807 | 3/2008 |

(Continued)

OTHER PUBLICATIONS

Kadoi et al., "A Study on Antenna Shape for Electro-Magnetic Resonant Type Wireless Power Transmission System," *2010 IEICE Society Conference*, vol. 1, pp. 11 (with partial translation).

*Primary Examiner* — Rexford Barnie
*Assistant Examiner* — Jagdeep Dhillon
(74) *Attorney, Agent, or Firm* — Oliff PLC

(57) ABSTRACT

A resonance coil includes plural unit coils where directions of magnetic fields which are formed by flowing of electric current are the same, in which the plural unit coils are arranged around a coil center line, and when the resonance
(Continued)

coil is seen in a direction of the coil center line, the coil wire that forms the resonance coil is formed so as not to be overlapped.

15 Claims, 20 Drawing Sheets

(51) Int. Cl.
*H01F 38/00* (2006.01)
*H01F 38/14* (2006.01)
*H02J 7/00* (2006.01)
*H02J 17/00* (2006.01)
*H04B 5/00* (2006.01)
*B60L 11/18* (2006.01)
*H02J 5/00* (2016.01)

(52) U.S. Cl.
CPC ......... *H04B 5/0037* (2013.01); *H04B 5/0081* (2013.01); *H02J 5/005* (2013.01); *Y02T 10/7005* (2013.01); *Y02T 10/7072* (2013.01); *Y02T 90/122* (2013.01); *Y02T 90/14* (2013.01)

(58) Field of Classification Search
USPC .......... 307/104, 149, 86, 82, 80; 361/43, 56; 455/1, 7; 713/313, 314; 375/259, 295; 73/313, 314
See application file for complete search history.

(56) References Cited

U.S. PATENT DOCUMENTS

| | | |
|---|---|---|
| 2005/0140482 A1 | 6/2005 | Cheng et al. |
| 2007/0267506 A1 | 11/2007 | Bashan et al. |
| 2008/0061785 A1 | 3/2008 | Soutome et al. |
| 2011/0018496 A1 | 1/2011 | Kozakai |
| 2011/0133570 A1* | 6/2011 | Mayo .................... H03F 3/2176 307/104 |
| 2012/0169138 A1* | 7/2012 | Singh .................... H02K 53/00 307/104 |
| 2013/0038281 A1 | 2/2013 | Sakakibara et al. |
| 2013/0127411 A1 | 5/2013 | Ichikawa et al. |

FOREIGN PATENT DOCUMENTS

| | | |
|---|---|---|
| JP | A-2010-73976 | 4/2010 |
| JP | A-2011-30318 | 2/2011 |
| JP | A-2011-234496 | 11/2011 |
| JP | A-2012-34431 | 2/2012 |
| JP | A-2012-109449 | 6/2012 |
| WO | WO 2012/014038 A2 | 2/2012 |

\* cited by examiner

RESONANCE COIL, ELECTRIC POWER TRANSMISSION DEVICE, ELECTRIC POWER RECEIVING DEVICE, AND ELECTRIC POWER TRANSMISSION SYSTEM

BACKGROUND OF THE INVENTION

1. Field of the Invention

The present invention relates to a resonance coil, an electric power transmission device, an electric power receiving device, and an electric power transmission system.

2. Description of Related Art

Recently, hybrid vehicles and electric vehicles that use electric power from batteries to drive driving wheels are receiving much attention in environmental consciousness.

In recent years in particular, for electrically driven vehicles that are equipped with the battery described above, wireless charging that can charge the battery without using a plug but in a noncontact manner receives attention. More recently, various types of charging method are proposed for the wireless charging method. Particularly, a technique that transmits electric power in the noncontact manner by utilizing a resonance phenomenon attracts lots of attention.

For example, a vehicle and a power supply device that are disclosed in Japanese Patent Application Publication No. 2010-73976 (JP-A-2010-73976) include a communication coil, respectively. The communication coil that is installed in the vehicle includes a resonance coil and a power receiving coil, and the communication coil that is installed in the power supply device includes a resonance coil and a power supply coil. Noncontact transmission of electric power is performed between the resonance coil that is installed in the power supply device and the resonance coil that is installed in the vehicle by utilizing the resonance phenomenon.

On page 11, Proceedings of Communication Vol. 1, 2010 IEICE Society Conference, entitled "A Study on Antenna Shape for Electro-Magnetic Resonant Type Wireless Power Transmission System" by Masafumi Kadoi, Nobuyoshi Kikuma, Hiroshi Hirayama, and Kunio Sakakibara, the resonance coil that is focused on prevention of deterioration of electric power transmission efficiency even if the resonance coil for electric power transmission and the resonance coil for electric power reception are misaligned is proposed.

In addition, as disclosed in Japanese Patent Application Publication No. 2003-79597 (JP-A-2003-79597), imaging devices such as a magnetic resonance imaging (MRI) that utilize a nuclear magnetic resonance phenomenon to achieve imaging of cross sections of body are known.

In the resonance coil that is disclosed in JP-A-2010-73976, if the resonance coil that is installed on the vehicle-side and the resonance coil on an equipment-side are misaligned, the transmission efficiency of electric power deteriorates significantly.

In the resonance coil that is disclosed in the aforementioned "A Study on Antenna Shape for Electro-Magnetic Resonant Type Wireless Power Transmission System," a coil wire that forms the resonance coil has an overlapping section in a height direction. In the overlapping section in the coil wire, coil wires need to have specific distances in the height direction in order to secure insulation properties between the coil wires. As a result, the resonance coil thickens in the height direction.

Briefly describing, the nuclear magnetic resonance phenomenon that the imaging device disclosed in JP-A-2003-79597 utilizes is the phenomenon such that when hydrogen atoms in water are subjected to magnetism, the hydrogen atoms resonate to generate signals. Because amount of water (amount of hydrogen atoms) varies depending on parts and organs in human body, the MRI irradiates magnetic fields in the human body, receives the signals that are generated by the aforementioned nuclear magnetic resonance phenomenon as appropriate, and creates cross-sectional images of human body based on received signals.

As described above, the nuclear magnetic resonance phenomenon that the MRI or the like utilizes and an electromagnetic resonant coupling that is utilized in transmission and reception of electric power use different phenomena from each other, and the structures differ entirely.

SUMMARY OF THE INVENTION

The present invention provides a resonance coil in which the decrease in the electric power transmission and receiving efficiencies can be prevented even in the case of misalignment and in which a reduction in thickness is achieved, and an electric power transmission device, an electric power receiving device and an electric power transmission system include the resonance coil.

A first aspect of the present invention relates to a resonance coil. The resonance coil includes a coil wire that forms plural unit coils where directions of magnetic fields which are formed by flowing of electric current are the same, the plural unit coils are arranged around a coil center line, and when the resonance coil is seen in a direction of the coil center line, the coil wire is formed so as not to be overlapped.

In the first aspect, the resonance coil may include an outer conductor section that is formed with the coil wire that extends to surround the coil center line and that includes a first connecting end and a second connecting end, and an inner conductor section in which one end is connected to the first connecting end and the other end is connected to the second connecting end and that is arranged within a region that is surrounded by the outer conductor section, and formed with the coil wire. Plural second regions that are surrounded by the inner conductor section and the outer conductor section may be formed in a first region that is surrounded by the outer conductor section. The unit coil may be formed with the outer conductor section and the inner conductor section that surround the second region.

In the first aspect, the outer conductor section may be formed by bending the coil wire, and the inner conductor section may be formed by bending the coil wire from the first connecting end and the second connecting end. In the first aspect, an area in which the plural second regions occupy may be larger than an area of third region that is surrounded by the first connecting end, the second connecting end, and the inner conductor section.

In the first aspect, the inner conductor section may include a main section that extends from the outer conductor section toward the coil center line, and the main section may extend to a vicinity of the outer conductor section so as to secure insulation properties with the outer conductor section so that the second region is divided to be formed plurally.

In the first aspect, the inner conductor section may include a main section that extends from the outer conductor section toward the coil center line, and a branch section that extends to branch from the main section and that is formed with the coil wire.

In the first aspect, the outer conductor section may include a first side section in which the first connecting end and the second connecting end are formed, a second side section in which one end is connected to one end of the first side section, a third side section in which one end is connected to the other end of the first side section, and a fourth side section that connects between the other end of the second side section and the other end of the third side section. The main section may extend from the first side section to the fourth side section, and the inner conductor section may include a first branch section that extends from the main section to the second side section and a second branch section that extends from the main section to the third side section.

In the first aspect, the resonance coil may include an outer conductor section that is formed with the coil wire that extends to surround the coil center line and that includes a first connecting end and a second connecting end, and an inner conductor section in which one end is connected to the first connecting end and the other end is connected to the second connecting end and that is arranged within a region that is surrounded by the outer conductor section, and formed with the coil wire. In a first region that is surrounded by the outer conductor section, plural second regions that are surrounded by the inner conductor section and the outer conductor section, a third region that is surrounded by the first connecting section, the second connecting section, and the inner conductor section, and plural fourth regions that are regions other than the third region and that are surrounded by the inner conductor section may be formed. The unit coil may be formed with the inner conductor section and the outer conductor section that surround the second region, and the inner conductor section that surrounds the fourth region.

In the first aspect, an area in which the plural second regions and the plural fourth regions occupy may be larger than an area in which the third region occupies.

In the first aspect, the inner conductor section may include a main section that extends from the outer conductor section toward the coil center line, a branch section that is formed to branch from the main section, and a projecting section that is formed to project from a midsection of the branch section in a length direction.

In the first aspect, the inner conductor section may be plurally formed with a distance in an extending direction of the outer conductor section. In the first aspect, the coil wire may be positioned on an imaginary plane.

The second aspect of the present invention relates to an electric power transmission device. The electric power transmission device includes the resonance coil for electric power transmission that is coupled to a resonance coil for electric power reception that is provided in an electric power receiving device through electromagnetic resonant coupling, and a coil that is supplied with electric power from an external power supply and that supplies electric power to the resonance coil for electric power transmission through electromagnetic induction.

The third aspect of the present invention relates to an electric power receiving device. The electric power receiving device includes the resonance coil for electric power reception that is coupled to a resonance coil for electric power transmission that is provided in an electric power transmission device through electromagnetic resonant coupling, and a coil that receives electric power from the resonance coil for electric power reception through electromagnetic induction.

The forth aspect of the present invention relates to an electric power transmission system. The electric power transmission system includes the electric power transmission device and the electric power receiving device.

According to the resonance coil of the first aspect to the forth aspect of the present invention, the decrease in the electric power transmission and receiving efficiencies can be prevented even in the case of misalignment, and furthermore, a reduction in thickness can be achieved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

A vehicle and an external power supply device according to a first embodiment of the present invention will be described hereinafter with reference to FIG. 1 through FIG. 8.

Figure 1:
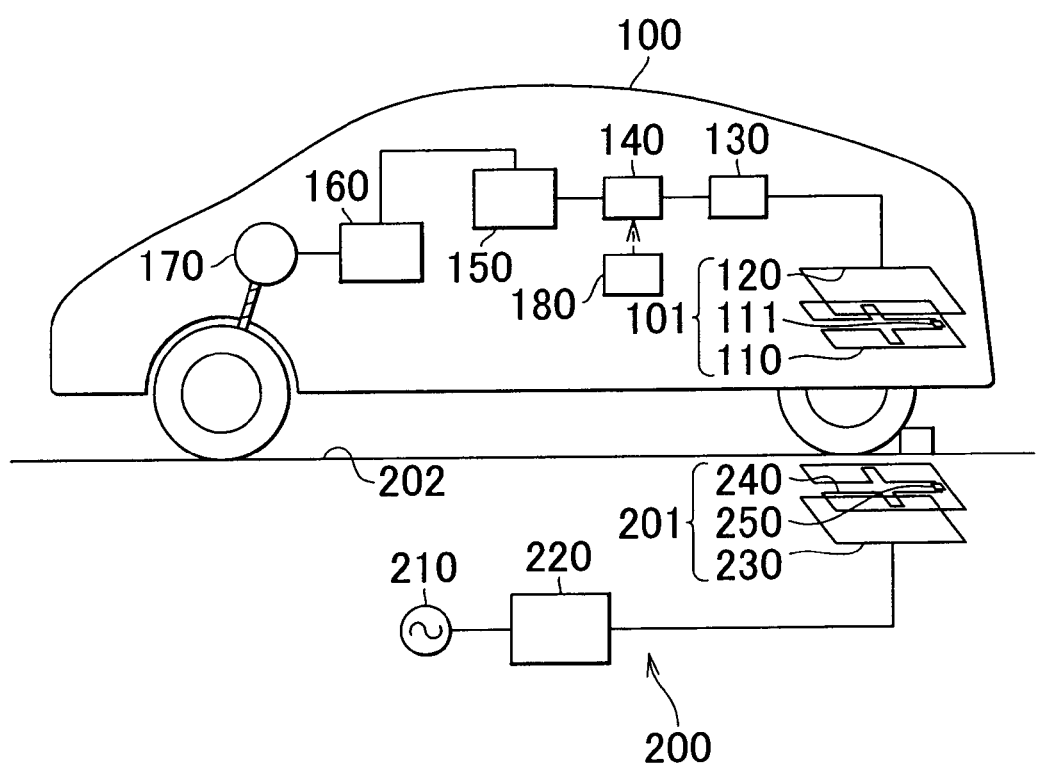
FIG. 1 is a schematic diagram that schematically shows an electrically driven vehicle 100 according to a first embodiment and an external power supply device 200 that supplies electric power to the electrically driven vehicle 100.

FIG. 1 is a schematic diagram that schematically shows electric power transmission and receiving systems which include an electrically driven vehicle 100 according to the first embodiment and an external power supply device 200 that supplies electric power to the electrically driven vehicle 100.

The electrically driven vehicle 100 is stopped at a specified position of a parking space 202 where the external power supply device 200 is provided and primarily receives electric power from the external power supply device 200. The electrically driven vehicle 100 can supply electric power to the external power supply device 200.

The parking space 202 is provided with a sprag and a line so that the electrically driven vehicle 100 can be stopped at the specified position.

The external power supply device 200 includes a high-frequency power driver 220 that is connected to an alternating-current power supply 210 and an equipment-side coil unit 201 that is connected to the high-frequency power driver 220. The equipment-side coil unit 201 primarily functions as a noncontact electric power transmission device. The equipment-side coil unit 201 includes an equipment-side resonance coil 240, an equipment-side capacitor 250 that is connected to the equipment-side resonance coil 240, and an equipment-side electromagnetic induction coil 230 that is electrically connected with the equipment-side resonance coil 240.

The alternating-current power supply 210 is a power supply outside of the vehicle and, for example, a power supply for the system. The high-frequency power driver 220 converts the electric power that is received from the alternating-current power supply 210 into high-frequency electric power and supplies the converted high-frequency power to the equipment-side electromagnetic induction coil 230. Frequencies of the high-frequency power in which the high-frequency power driver 220 generates are 1 MHz through several tens of MHz.

The equipment-side electromagnetic induction coil 230 is supplied with the aforementioned high-frequency power, and therefore the amount of magnetic flux that is generated by the equipment-side electromagnetic induction coil 230 changes over time.

The equipment-side resonance coil 240 is coupled to the equipment-side electromagnetic induction coil 230 through electromagnetic induction coupling. When the amount of magnetic flux from the equipment-side resonance coil 240 changes, high-frequency current flows through the equipment-side resonance coil 240 by the electromagnetic induction.

At this time, electric current is supplied to the equipment-side electromagnetic induction coil 230 so that frequency of the high-frequency current that flows through the equipment-side resonance coil 240 and resonant frequency that is determined by the reluctance of the equipment-side electromagnetic induction coil 230 and the capacitance C of the equipment-side capacitor 250 substantially agree with each other. The equipment-side resonance coil 240 and the equipment-side capacitor 250 function as an LC resonator.

An electric field and a magnetic field of the substantially same frequency as the resonant frequency are formed around the equipment-side resonance coil 240. As described above, an electromagnetic field of the specified frequency is formed around the equipment-side resonance coil 240.

The electrically driven vehicle 100 includes an LC resonator that has the same resonant frequency as that of the LC resonator which is formed with the equipment-side resonance coil 240 and the equipment-side capacitor 250. The aforementioned LC resonator Sand the LC resonator that is formed with the equipment-side resonance coil 240 and the equipment-side capacitor 250 are coupled through electromagnetic resonant coupling, and therefore electric power is transmitted from the external power supply device 200 to the electrically driven vehicle 100.

The electrically driven vehicle 100 and the external power supply device 200 primarily use a near field (evanescent field) of the electromagnetic field that is formed with the equipment-side resonance coil 240 and the equipment-side capacitor 250 to supply electric power from the external power supply device 200 to the electrically driven vehicle 100. The detailed description of the wireless electric power transmission and receiving method using the electromagnetic resonance method will be made later.

The electrically driven vehicle 100 includes a vehicle-side coil unit 101 that primarily functions as a noncontact electric power receiving device, a rectifier 130 that is connected to the vehicle-side coil unit 101, a DC/DC converter 140 that is connected to the rectifier 130, a battery 150 that is connected to the DC/DC converter 140, a power control unit (PCU) 160, a motor unit 170 that is connected to the power control unit 160, and a vehicle electronic control unit (ECU) 180 that controls driving of the DC/DC converter 140, the power control unit 160, and the like.

The electrically driven vehicle 100 according to the present embodiment is a hybrid vehicle that includes an engine (not shown); however, the electrically driven vehicle 100 also includes an electric vehicle and a fuel cell vehicle if the vehicle is driven with a motor.

The vehicle-side coil unit 101 includes a vehicle-side resonance coil 110, a vehicle-side capacitor 111 that is connected to the vehicle-side resonance coil 110, and a vehicle-side electromagnetic induction coil 120 that is coupled to the vehicle-side resonance coil 110 through electromagnetic induction. The detailed structure of the vehicle-side coil unit 101 will be described later.

The vehicle-side resonance coil 110 and the vehicle-side capacitor 111 constitute an LC resonator. Resonant frequency of the LC resonator that is formed with the vehicle-side resonance coil 110 and the vehicle-side capacitor 111 and resonant frequency of the LC resonator that is formed with the equipment-side resonance coil 240 and the equipment-side capacitor 250 substantially agree with each other.

When the equipment-side resonance coil 240 is supplied with the high-frequency current of the same frequency as the resonant frequency of the LC resonator, the electromagnetic field where the frequency is the resonant frequency is generated.

When the vehicle-side resonance coil 110 is placed within an area of, for example, several meters from the equipment-side resonance coil 240, the LC resonator that is formed with the vehicle-side resonance coil 110 and the vehicle-side capacitor 111 resonates, and the current flows through the vehicle-side resonance coil 110. As described above, the vehicle-side resonance coil 110 and the equipment-side resonance coil 240 are coupled through electromagnetic resonant coupling.

The vehicle-side electromagnetic induction coil 120 is coupled to the vehicle-side resonance coil 110 through electromagnetic induction coupling and takes out the electric power that the vehicle-side resonance coil 110 receives. The vehicle-side electromagnetic induction coil 120 successively takes the electric power out of the vehicle-side resonance coil 110, and thus the electric power is successively supplied from the equipment-side resonance coil 240 to the vehicle-side resonance coil 110 through the electromagnetic field. As described above, the vehicle-side coil unit 101 and the equipment-side coil unit 201 adopt a so-called electromagnetic resonance type wireless electric power transmission and receiving method.

The rectifier 130 is connected to the vehicle-side electromagnetic induction coil 120 and converts an alternating current that is supplied from the vehicle-side electromagnetic induction coil 120 into a direct current to supply it to the DC/DC converter 140.

The DC/DC converter 140 regulates the voltage of the direct current that is supplied from the rectifier 130 to supply it to the battery 150.

The power control unit 160 includes a converter that is connected to the battery 150 and an inverter that is connected to the converter. The converter regulates (boosts) the direct current that is supplied from the battery 150 to supply it to the inverter. The inverter converts the direct current that is supplied from the converter into an alternating current to supply it to the motor unit 170.

The motor unit 170 adopts, for example, a three-phase alternating current motor and is driven by the alternating current that is supplied from the inverter of the power control unit 160.

When the electric power that is stored in the battery 150 is supplied to the alternating-current power supply 210, for example, the DC/DC converter 140 boosts the current from the battery 150 and supplies it to the rectifier 130. The rectifier 130 converts the direct current from the DC/DC converter 140 into the high-frequency current. The frequency of the high-frequency current is determined as the resonant frequency described above.

The rectifier 130 supplies the high-frequency current to the vehicle-side electromagnetic induction coil 120. The vehicle-side resonance coil 110 receives the high-frequency current from the vehicle-side electromagnetic induction coil 120 through the electromagnetic induction. The frequency of the high-frequency current substantially agrees with the resonant frequency, and therefore the LC resonator that is formed with the vehicle-side resonance coil 110 and the vehicle-side capacitor 111 resonates. The electromagnetic field in which the frequency is determined as the aforementioned resonant frequency is formed around the vehicle-side resonance coil 110.

When the equipment-side resonance coil 240 is placed within an area of, for example, several meters from the vehicle-side resonance coil 110, the LC resonator that is formed with the equipment-side resonance coil 240 and the equipment-side capacitor 250 resonates. Then, the electric power that is supplied to the equipment-side resonance coil 240 is drawn to the equipment-side electromagnetic induction coil 230 through the electromagnetic induction. The electric power that is drawn by the equipment-side resonance coil 240 is supplied to the alternating-current power supply 210 through the high-frequency power driver 220.

When the electrically driven vehicle 100 is the hybrid vehicle, the electrically driven vehicle 100 further includes an engine and a drive power splitter mechanism, and the motor unit 170 includes a motor generator that primarily functions as a generator and a motor generator that primarily functions as a motor.

As described above, a resonance method that is the wireless electric power transmission and receiving method and utilizes the electromagnetic field is adopted between the vehicle-side coil unit 101 and the equipment-side coil unit 201 according to the first embodiment.

Figure 2:
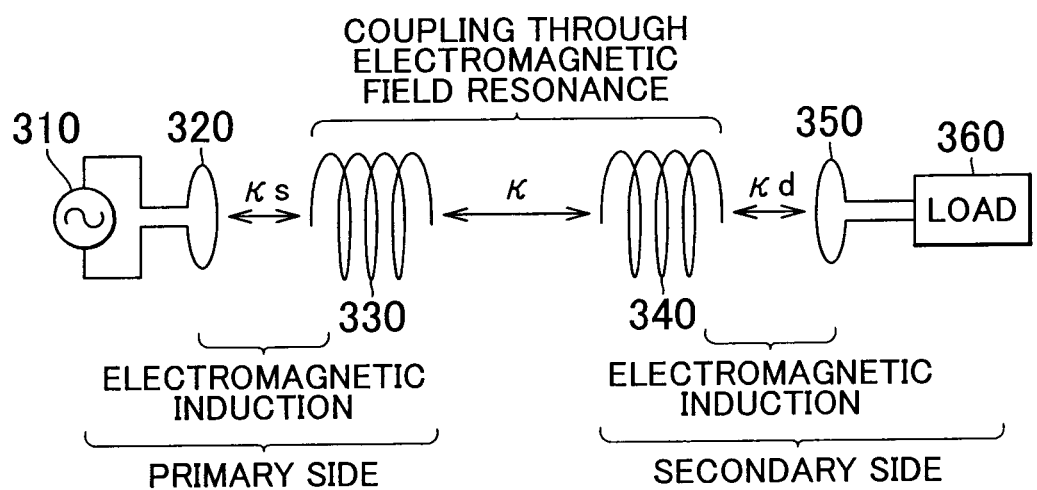
FIG. 2 is a schematic diagram that illustrates the principle of transmission and reception of electric power by a resonance method.

FIG. 2 is a schematic diagram that illustrates the principle of transmission and reception of electric power by a resonance method, and the principle of transmission and reception of electric power by a resonance method will be described with reference to FIG. 2.

Referring to FIG. 2, in this resonance method, two LC resonance coils that have the same natural frequencies resonate in the electromagnetic field (near field) in a similar manner that two tuning forks resonate, and therefore the electric power is transmitted from one coil to the other coil through the electromagnetic field.

Specifically, a primary coil 320 is connected to a high-frequency power source 310, and the high-frequency electric power of 1 MHz through several tens of MHz is supplied to a primary self-resonance coil 330 that is magnetically coupled to the primary coil 320 through the electromagnetic induction. The primary self-resonance coil 330 is an LC resonator with an inductance of the coil itself and floating capacitance (including capacitance of a capacitor if the capacitor is connected to the coil) and resonates with a secondary self-resonance coil 340 that has the same resonant frequency as the primary self-resonance coil 330 through the electromagnetic field (near field). Therefore, energy (electric power) moves from the primary self-resonance coil 330 to the secondary self-resonance coil 340 through the electromagnetic field. The energy (electric power) that moves to the secondary self-resonance coil 340 is taken out by a secondary coil 350 that is magnetically coupled to the secondary self-resonance coil 340 through the electromagnetic induction and supplied to a load 360. The transmission of electric power by the resonance method is achieved when Q factor that indicates resonance strength between the primary self-resonance coil 330 and the secondary self-resonance coil 340 is greater than 100, for example.

When the correspondence relation between the structures of FIG. 1 and FIG. 2 is described, the alternating-current power supply 210 and the high-frequency power driver 220 shown in FIG. 1 correspond to the high-frequency power source 310 in FIG. 2. The equipment-side electromagnetic induction coil 230 shown in FIG. 1 corresponds to the primary coil 320 in FIG. 2. In addition, the equipment-side resonance coil 240 and the equipment-side capacitor 250 shown in FIG. 1 correspond to the primary self-resonance coil 330 and the floating capacitance of the primary self-resonance coil 330 in FIG. 2.

The vehicle-side resonance coil 110 and the vehicle-side capacitor 111 shown in FIG. 1 correspond to the secondary self-resonance coil 340 and the floating capacitance of the secondary self-resonance coil 340 in FIG. 2.

The vehicle-side electromagnetic induction coil 120 shown in FIG. 1 corresponds to the secondary coil 350 in FIG. 2. The rectifier 130, the DC/DC converter 140, and the battery 150 shown in FIG. 1 correspond to the load 360 shown in FIG. 2.

Furthermore, in the wireless electric power transmission and receiving method according to the first embodiment, the near field (evanescent field) that an "electrostatic field" of the electromagnetic field is predominant is used, and therefore the electric power transmission and receiving efficiencies are improved.

Figure 3:
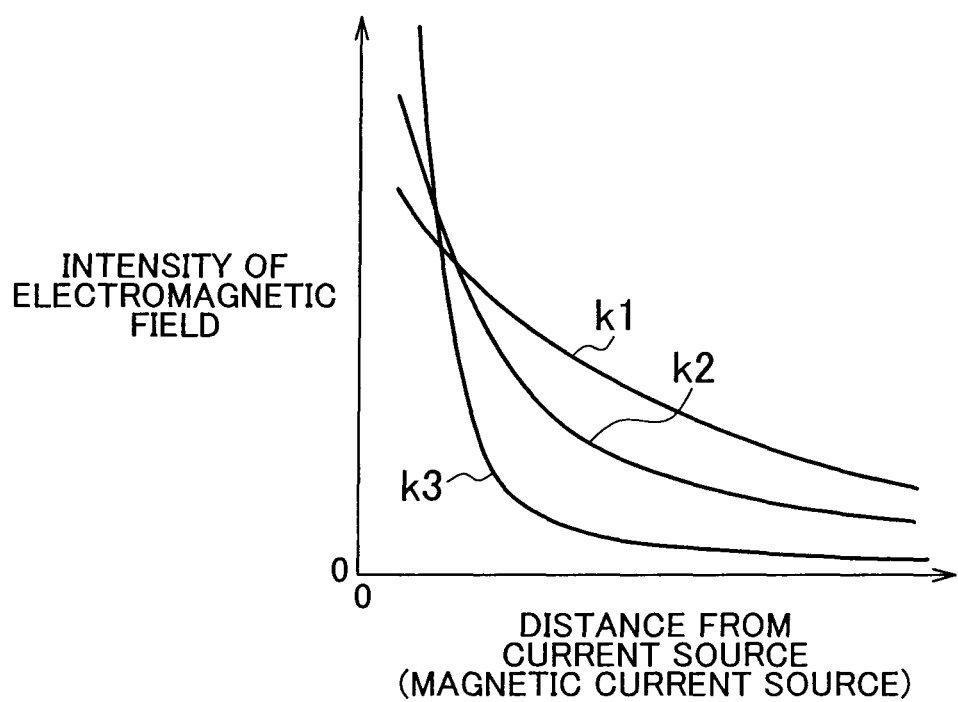
FIG. 3 is a chart that shows a relation between a distance from a current source (magnetic current source) and the intensity of electromagnetic field.

FIG. 3 is a chart that shows a relation between a distance from the current source (magnetic current source) and the intensity of electromagnetic field. Referring to FIG. 3, the electromagnetic field is formed from three components. A curve k1 is a component that is inversely proportional to the distance from a wave source and referred to as a "radiant electric field." A curve k2 is a component that is inversely proportional to the square of the distance from the wave source and referred to as an "induction electric field." In addition, a curve k3 is a component that is inversely proportional to the cube of the distance from the wave source and referred to as an "electrostatic field."

The "electrostatic field" is a region where the intensity of an electromagnetic wave sharply drops along with the distance from the wave source. In the resonance method, the near field (evanescent field) that the "electrostatic field" is predominant is used, and thus the energy (electric power) is transmitted. That is, the near field that the "electrostatic field" is predominant makes a pair of the resonators (for example, a pair of LC resonance coils) that have the same natural frequencies resonate, and thus the energy (electric power) is transmitted from one resonator (primary self-resonance coil) to the other resonator (secondary self-resonance coil). The "electrostatic field" does not propagate the energy to a distance, and therefore the resonance method can achieve the transmission of electric power with lower energy loss in comparison with the electromagnetic wave that transmits the energy (electric power) through the "radiant electric field" which propagates the energy to a distance.

As described above, the electrically driven vehicle 100 according to the first embodiment and the external power supply device 200 uses the resonance of the near field of the electromagnetic field to transmit or receive the electric power between the vehicle-side coil unit 101 of the electrically driven vehicle 100 and the equipment-side coil unit 201 of the external power supply device 200.

Figure 4:
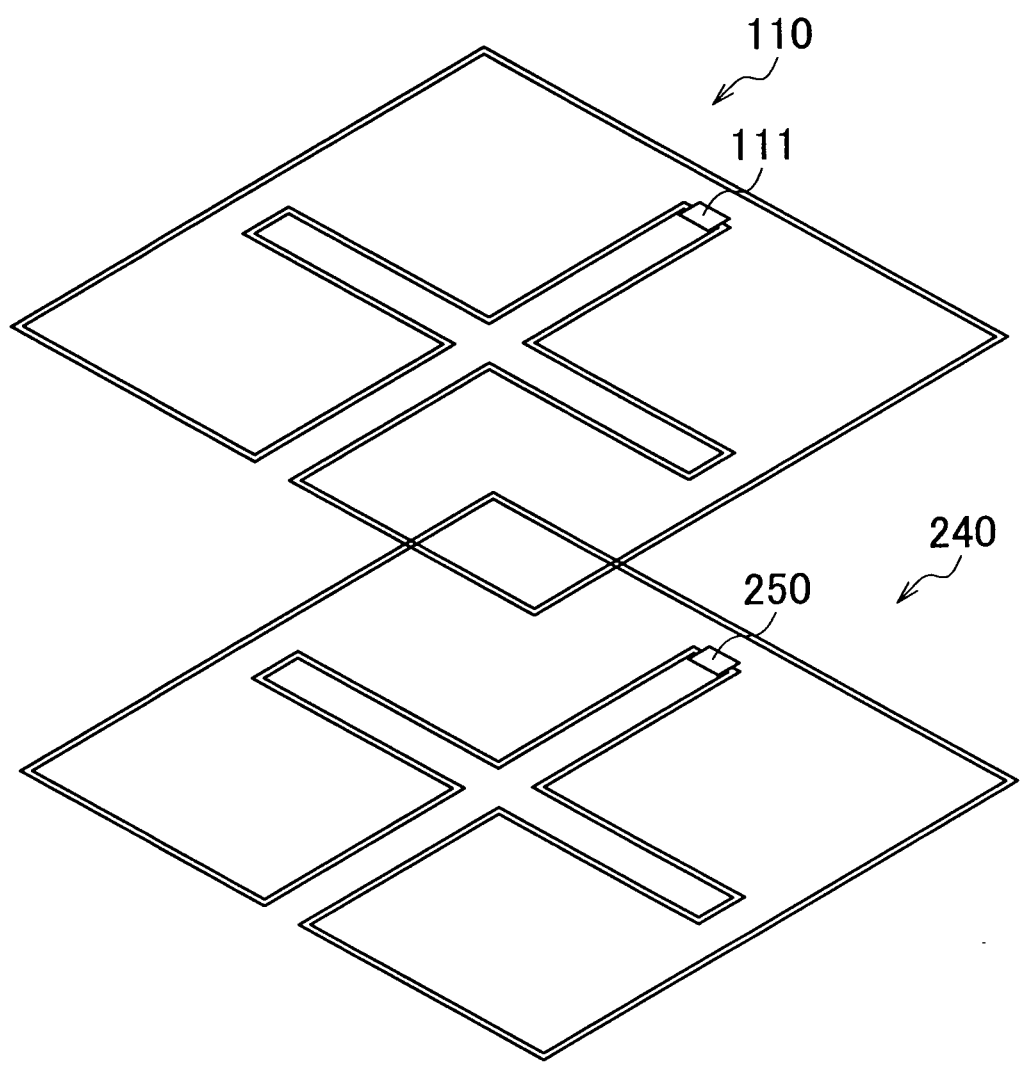
FIG. 4 is a perspective view that schematically shows a vehicle-side resonance coil 110 and an equipment-side resonance coil 240 when the electric power is transmitted from an equipment-side coil unit 201 to a vehicle-side coil unit 101.

FIG. 4 is a perspective view that schematically shows the vehicle-side resonance coil 110 and the equipment-side resonance coil 240 when the electric power is transmitted from the equipment-side coil unit 201 to the vehicle-side coil unit 101.

As shown in the drawing, when the electric power is transmitted, the vehicle-side resonance coil 110 and the equipment-side resonance coil 240 are arranged to face each other.

As seen clearly from FIG. 4, the vehicle-side resonance coil 110 and the equipment-side resonance coil 240 have substantially the same structure.

Figure 5:
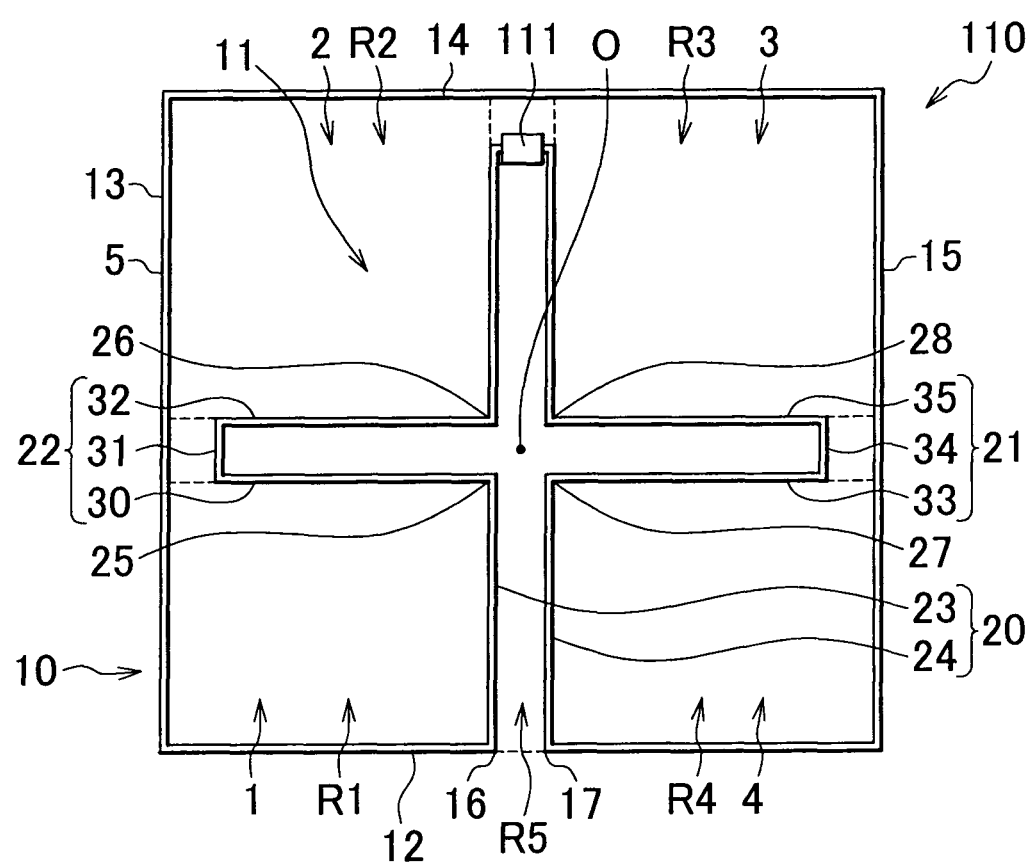
FIG. 5 is a plan view that shows the vehicle-side resonance coil 110.

FIG. 5 is a plan view that shows the vehicle-side resonance coil 110. Referring to FIG. 5, the vehicle-side resonance coil 110 is formed by bending a coil wire 5, and the coil wire 5 is formed to extend around a winding center line O.

The vehicle-side resonance coil 110 includes an outer conductor section 10 that is formed by bending the coil wire 5 to surround the winding center line O, and an inner conductor section 11 that is connected to the outer conductor section 10, arranged within the region that is surrounded by the outer conductor section 10, and formed with the coil wire 5.

In this embodiment, the outer conductor section 10 is formed in a square shape; however, it is understood that the shape of the outer conductor section 10 may adopt various shapes such as a circle, a polygon shape, and an elliptical shape.

The outer conductor section 10 includes a side section 12, a side section 13 in which one end is connected to one end of the side section 12, a side section 15 in which one end is connected to the other end of the side section 12, and a side section 14 that connects between the other end of the side section 13 and the other end of the side section 15. Length of the respective side sections 12 through 15 is set as about 1 m, for example.

A connecting end 16 and a connecting end 17 are formed in the side section 12. One end of the inner conductor section 11 is connected to the connecting end 16, and the other end of the inner conductor section 11 is connected to the connecting end 17.

The inner conductor section 11 includes a main section 20 that extends in a direction from the outer conductor section 10 toward the winding center line O and branch sections 21 and 22 that are formed to branch from the main section 20.

The main section 20 extends from the side section 12 toward the side section 14, passes through the winding center line O, and reaches in the vicinity of the side section 14.

The main section 20 includes main line sections 23 and 24 that are arranged in approximately parallel with each other. The main line section 23 is connected to the connecting end 16 and extends from the connecting end 16 to reach in the vicinity of the side section 14. The main line section 24 is connected to the connecting end 17 and formed from the connecting end 17 to reach in the vicinity of the side section 14. The vehicle-side capacitor 111 is connected between tip sections of the main line sections 23 and 24.

In the example shown in FIG. 5, the outer conductor section 10 and the inner conductor section 11 are formed by bending one coil wire 5 and connected into one body.

Connecting ends 25 and 26 are formed in a midsection in a length direction of the main line section 23, and connecting ends 27 and 28 are formed in a midsection in a length direction of the main line section 24.

The branch section 22 is connected to the connecting ends 25 and 26, and the branch section 21 is connected to the connecting ends 27 and 28.

One end of the branch section 22 is connected to the connecting end 25, and the other end of the branch section 22 is connected to the connecting end 26. The branch section 22 is formed to branch from the main section 20, and the branch section 22 is formed by bending the coil wire 5.

Specifically, the branch section 22 includes a branch conductor section 30 that is formed by bending the coil wire 5 from the connecting end 25, a branch conductor section 31 that is formed by bending the coil wire 5 from the tip section of the branch conductor section 30, and a branch conductor section 32 that is formed by bending the coil wire 5 at the tip section of the branch conductor section 31, and the tip section of the branch conductor section 32 is connected to the connecting end 26.

The branch section 21 includes a branch conductor section 33 that is formed by bending the coil wire 5 from the connecting end 27, a branch conductor section 34 that is formed by bending the coil wire 5 at the tip section of the branch conductor section 33, and a branch conductor section 35 that is formed by bending the coil wire 5 at the tip section of the branch conductor section 34, and the tip section of the branch conductor section 35 is connected to the connecting end 28.

Spacing between the main line sections 23 and 24, spacing between the branch conductor sections 30 and 32, and spacing between the branch conductor sections 35 and 33 are all set to be about 5 cm. In addition, both of spacing between the branch conductor section 31 and the side section 13 and spacing between the branch conductor section 34 and the side section 15 are set to be about 5 cm. As described above, the spacing between the adjacent coil wires is set as the spacing in which the insulation properties can be secured.

Within the region that is surrounded by the outer conductor section 10, plural regions R1 through R4 that are surrounded by the inner conductor section 11 and the outer conductor section 10 are formed.

The region R1 is surrounded by a part of the side section 13, a part of the side section 12, the main line section 23, and the branch conductor section 30. The unit coil 1 is formed with a part of the side section 13, a part of the side section 12, the main line section 23, and the branch conductor section 30 which all form the region R1.

Similarly, the region R2 is surrounded by a part of the side section 14, a part of the side section 13, the branch conductor section 32, and a part of the main line section 23, and the unit coil 2 is formed with coil wires that form the region R2.

The region R3 is surrounded by a part of the main line section 24, the branch conductor section 35, a part of the side section 15, and a part of the side section 14, and the unit coil 3 is formed with the branch conductor section 35, a part of the side section 15, and a part of the side section 14. The region R4 is surrounded by the branch conductor section 33, a part of the main line section 24, a part of the side section 12, and a part of the side section 15, and the unit coil 4 is formed with the branch conductor section 33, a part of the main line section 24, a part of the side section 12, and a part of the side section 15.

As described above, within the region that is surrounded by the outer conductor section 10, plural regions R1 through R4 that are surrounded by the outer conductor section 10 and the inner conductor section 11 are formed. In the outer conductor section 10 and the inner conductor section 11, the unit coils are respectively formed in the parts that form the regions R1 through R4.

As clearly seen from the drawing, when the vehicle-side resonance coil 110 is seen in the direction of the winding center line O, the vehicle-side resonance coil 110 that includes plural unit coils 1 through 4 does not have any parts where the coil wires 5 that form the vehicle-side resonance coil 110 overlap. Therefore, the vehicle-side resonance coil 110 does not have any parts where the vehicle-side resonance coil 110 thickens in the height direction, and a reduction in thickness of the vehicle-side resonance coil 110 is achieved.

The vehicle-side resonance coil 110 is formed by bending the coil wires 5 on an identical imaginary plane, and the thickness of the vehicle-side resonance coil 110 substantially agrees with the thickness of the coil wires 5. The imaginary plane is an imaginary plane that is perpendicular to the winding center line O.

As clearly seen from FIG. 4 and the like, the equipment-side resonance coil 240 is constructed in a similar manner to the vehicle-side resonance coil 110, and the equipment-side resonance coil 240 achieves a reduction in thickness as the vehicle-side resonance coil 110 does.

In FIG. 5, the region that is surrounded by the connecting end 16, the main line section 23, the branch conductor section 30, the branch conductor section 31, the branch conductor section 32, the main line section 24, the branch conductor section 35, the branch conductor section 34, the branch conductor section 33, and the connecting end 17 is determined as the region R5. The sum of the regions that are occupied by the regions R1 through R4 is larger than the region that is occupied by the region R5.

Figure 6:
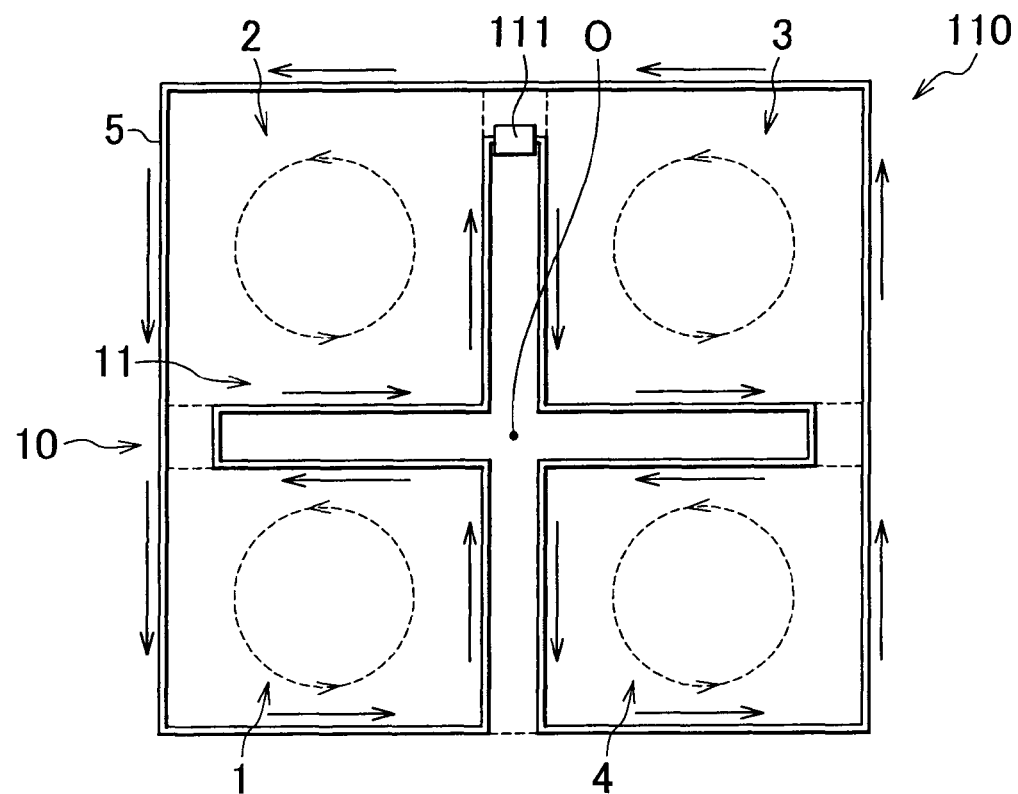
FIG. 6 is a plan view that shows a manner when electric current flows through the vehicle-side resonance coil 110.

FIG. 6 is a plan view that shows a manner when electric current flows through the vehicle-side resonance coil 110. As shown in FIG. 6, the directions of electric current that flows through respective unit coils 1 through 4 are consistent with each other, and therefore the directions of the magnetic fields that are formed by the unit coils 1 through 4 are also consistent with each other.

Figure 7:
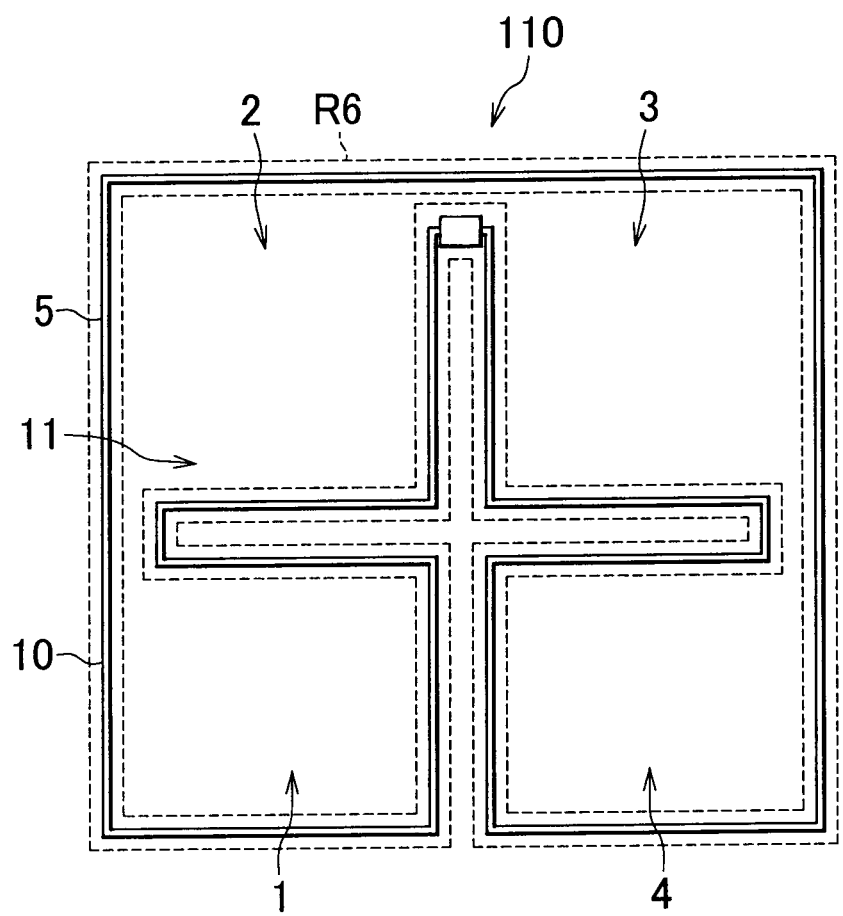
FIG. 7 is a plan view that shows the vehicle-side resonance coil 110 in reception of the electric power.

FIG. 7 is a plan view that shows the vehicle-side resonance coil 110 in reception of the electric power. In the reception of the electric power, alternating current in which the frequency is set to the resonant frequency flows through the vehicle-side resonance coil 110, and the electromagnetic field (near field) is formed around the vehicle-side resonance coil 110. In FIG. 7, an intense electric field region R6 that is the region of the electromagnetic field with high intensity in the electromagnetic fields which are formed is indicated by dashed lines, and the intense electric field region R6 is formed around the coil wire 5 of the vehicle-side resonance coil 110. The unit coils 1 through 4 occupy the most part of the region that is surrounded by the outer conductor section 10, and therefore the intense electric field region R6 is formed over a large region.

In addition, the equipment-side resonance coil 240 is formed in a similar manner to the vehicle-side resonance coil 110. When the electric power is transmitted and received between the equipment-side resonance coil 240 and the vehicle-side resonance coil 110, the intense electric field region is also formed around the coil wire that forms the equipment-side resonance coil 240.

As shown in FIG. 4, when the vehicle-side resonance coil 110 and the equipment-side resonance coil 240 are aligned with each other in the height direction, the degree of electrical coupling between the vehicle-side resonance coil 110 and the equipment-side resonance coil 240 increases, and therefore the electric power is satisfactorily transmitted from the equipment-side resonance coil 240 to the vehicle-side resonance coil 110.

Figure 8:
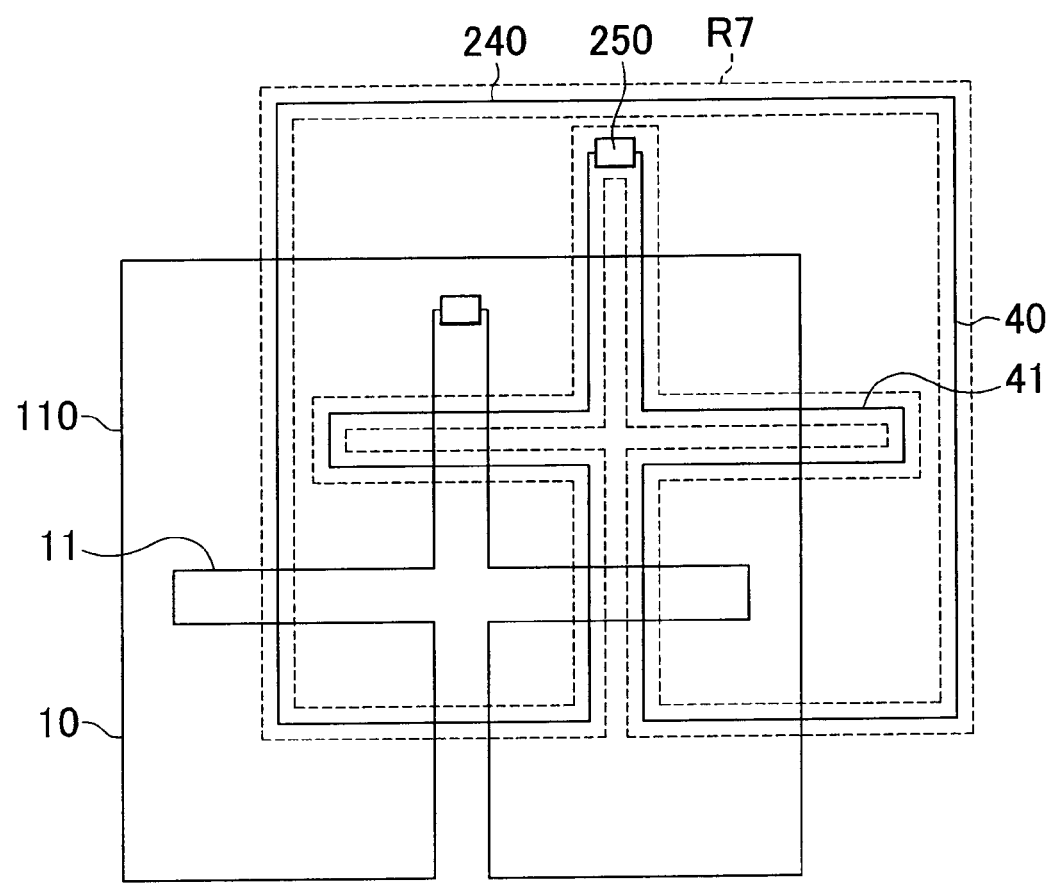
FIG. 8 is a plan view that shows a state where the equipment-side resonance coil 240 and the vehicle-side resonance coil 110 are misaligned in a horizontal direction when the electric power is transmitted and received between the equipment-side resonance coil 240 and the vehicle-side resonance coil 110.

FIG. 8 is a plan view that shows a state where the equipment-side resonance coil 240 and the vehicle-side resonance coil 110 are misaligned in a horizontal direction when the electric power is transmitted and received between the equipment-side resonance coil 240 and the vehicle-side resonance coil 110.

In FIG. 8, the equipment-side resonance coil 240 includes an outer conductor section 40 and an inner conductor section 41 that is arranged in the inside of the outer conductor section 40 in the similar manner to the vehicle-side resonance coil 110. Alternating current in which the frequency is set to the resonant frequency flows through the equipment-side resonance coil 240, and the intense electric field region R7 is formed around the equipment-side resonance coil 240.

In the state that is shown in FIG. 8, the vehicle-side resonance coil 110 is misaligned in the horizontal direction with respect to the equipment-side resonance coil 240.

Because the inner conductor section 41 is formed in the equipment-side resonance coil 240 and the inner conductor section 11 is formed in the vehicle-side resonance coil 110, it is understood that the vehicle-side resonance coil 110 overlaps with the intense electric field region R7 at many points.

As described above, because the vehicle-side resonance coil 110 overlaps with the intense electric field region R7 at plural parts, the electrical coupling between the vehicle-side resonance coil 110 and the equipment-side resonance coil 240 is maintained, and the vehicle-side resonance coil 110 can satisfactorily receive the electric power from the equipment-side resonance coil 240.

As a result, if the vehicle-side resonance coil 110 is misaligned with respect to the equipment-side resonance coil 240, the decrease in the electric power transmission and receiving efficiencies can be prevented.

Second Embodiment

With reference to FIG. 9 through FIG. 14 and FIG. 1 through FIG. 8 as appropriate, the vehicle-side resonance coil 110 according to the present embodiment will be described. In the structure that is shown in FIG. 9, descriptions of the same or corresponding structure to the structures that are shown in FIG. 1 through FIG. 8 are not made in some cases.

Figure 9:
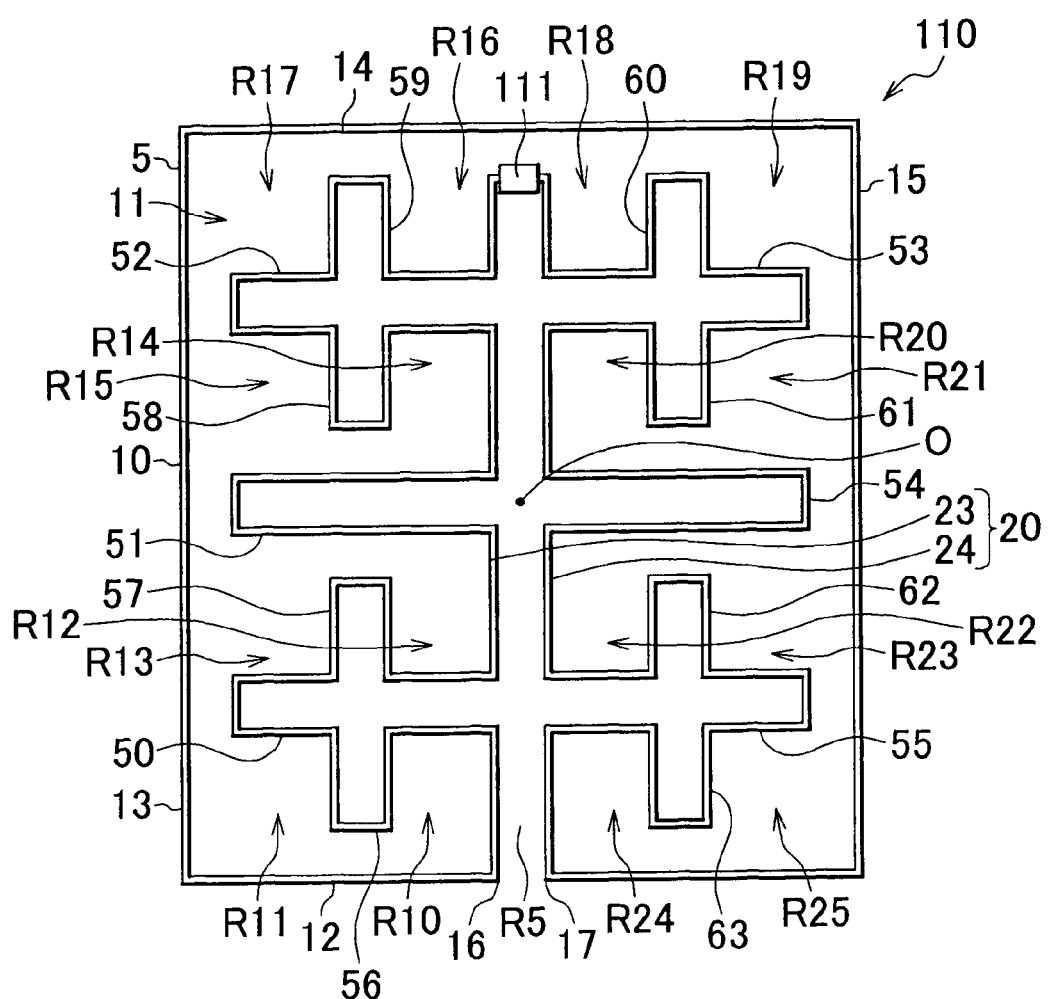
FIG. 9 is a plan view that shows the vehicle-side resonance coil 110 according to a second embodiment.

FIG. 9 is a plan view that shows the vehicle-side resonance coil 110 according to the second embodiment. As shown in FIG. 9, the vehicle-side resonance coil 110 includes the outer conductor section 10 that is formed to surround the winding center line O and the inner conductor section 11 that is connected to the outer conductor section 10 and arranged in the region which is surrounded by the outer conductor section 10.

The vehicle-side resonance coil 110 is formed by bending one coil wire 5 and does not have any overlaps in the coil wire 5 when the vehicle-side resonance coil 110 is seen in the direction of the winding center line O. Therefore, in the vehicle-side resonance coil 110 according to the second embodiment, a reduction in thickness in the height direction (extending direction of the winding center line O) is achieved.

One end of the inner conductor section 11 is connected to the connecting end 16, and the other end of the inner conductor section 11 is connected to the connecting end 17.

The inner conductor section 11 includes the main section 20 that includes the main line sections 23 and 24, branch sections 50, 51, and 52 that are formed to branch from the main line section 23, and branch sections 53, 54, and 55 that are formed to branch from the main line section 24 of the main section 20.

The branch sections 50, 51, and 52 are formed by bending the coil wire 5 so as to project from the main line section 23. The branch sections 50, 51, and 52 are formed to be successively arranged from the connecting end 16 toward the tip section of the main line section 23.

Projecting sections 56 and 57 that project from the midsection of the branch section 50 in the length direction are formed in the branch section 50. The projecting sections 58 and 59 that project from the midsection of the branch section 52 in the length direction are formed in the branch section 52. The projecting sections 62 and 63 that project from the midsection of the branch section 55 in the length direction are formed in the branch section 55. The projecting sections 60 and 61 that project from the midsection of the branch section 53 in the length direction are formed in the branch section 53.

The projecting sections 56, 57, 58, 59, 60, 61, 62, and 63 are formed by bending the coil wire 5 so as to project from the branch sections 50, 52, 53, and 55, and the overlapping portion of the coil wire 5 in the height direction is not formed.

A region R5 that is surrounded by the connecting end 16, the inner conductor section 11, and the connecting end 17 is formed in the region that is surrounded by the outer conductor section 10.

In a section other than the region R5 which is within the region that is surrounded by the outer conductor section 10, plural regions R10, R11, R13, R15, R16, R17, R18, R19, R21, R23, R24, and R25 that are surrounded by the outer conductor section 10 and the inner conductor section 11 and the regions R12, R14, R20, and R122 that are surrounded by the inner conductor section 11 are formed.

Specifically, the region R10 is surrounded by a part of the side section 12, a part of the main line section 23, a part of the branch section 50, and a part of the projecting section 56. The region R11 is surrounded by a part of the side section 13, a part of the side section 12, a part of the projecting section 56, and a part of the branch section 50. The region R12 is surrounded by a part of the main line section 23, a part of the branch section 50, a part of the projecting section 57, and a part of the branch section 51. The region R13 is surrounded by a part of the side section 13, a part of the projecting section 57, a part of the branch section 50, and a part of the branch section 51.

The region R14 is surrounded by a part of the branch section 51, a part of the main line section 23, a part of the branch section 52, and a part of the projecting section 58. The region R15 is surrounded by a part of the side section 13, a part of the branch section 51, a part of the projecting section 58, and a part of the branch section 52.

The region R16 is surrounded by a part of the main line section 23, a part of the branch section 52, a part of the projecting section 59, and a part of the side section 14. The region R17 is surrounded by a part of the side section 13, a part of the projecting section 59, a part of the branch section 52, and a part of the side section 14.

The region R18 is surrounded by a part of the side section 14, a part of the main line section 24, a part of the branch section 53, and a part of the projecting section 60. The region R19 is surrounded by a part of the side section 14, a part of the side section 15, a part of the projecting section 60, and a part of the branch section 53. The region R20 is surrounded by a part of the main line section 24, a part of the branch section 53, a part of the projecting section 61, and a part of the branch section 54. The region R21 is surrounded by a part of the side section 15, a part of the projecting section 61, a part of the branch section 53, and a part of the branch section 54.

The region R22 is surrounded by a part of the branch section 54, a part of the main line section 24, a part of the branch section 55, and a part of the projecting section 62. The region R23 is surrounded by a part of the branch section 54, a part of the side section 15, a part of the projecting section 62, and a part of the branch section 55. The region R24 is surrounded by a part of the main line section 24, a part of the branch section 55, a part of the projecting section 63, and a part of the side section 12. The region R25 is surrounded by a part of the branch section 55, a part of the projecting section 63, a part of the side section 12, and a part of the side section 15.

Figure 10:
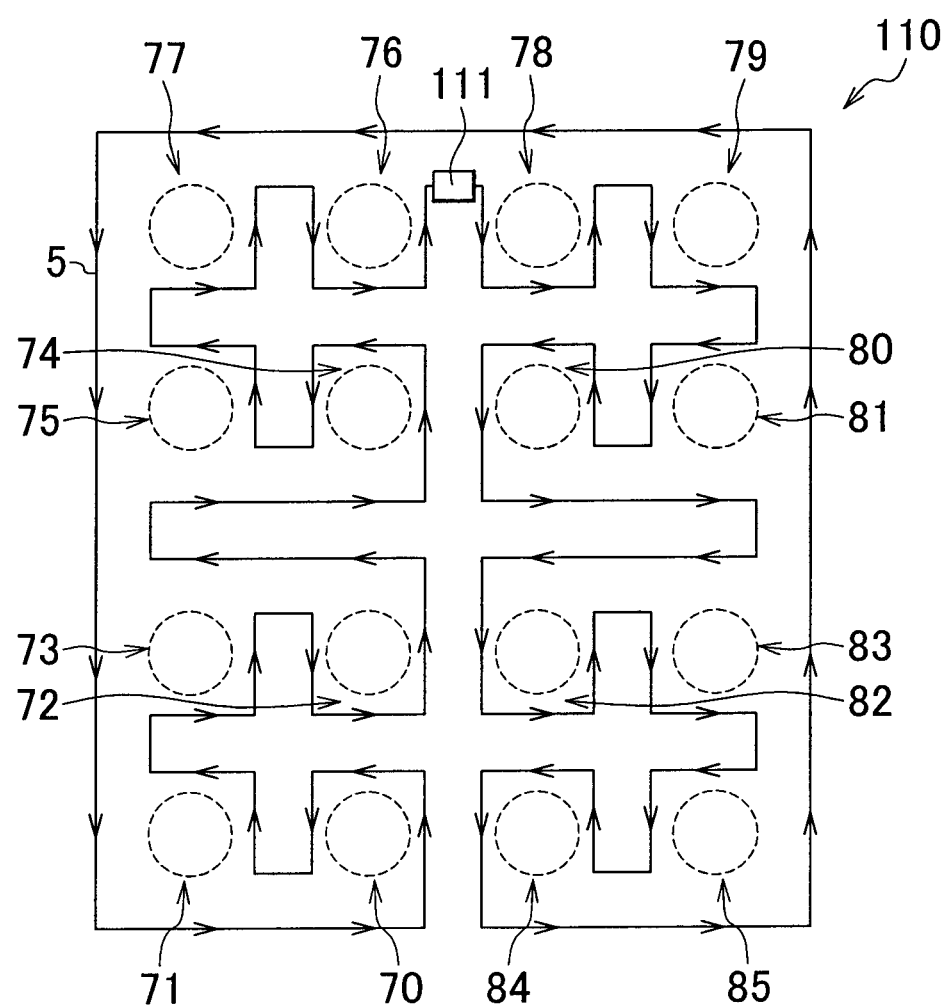
FIG. 10 is a plan view that shows a manner when electric current flows through the vehicle-side resonance coil 110.
Figure 11:
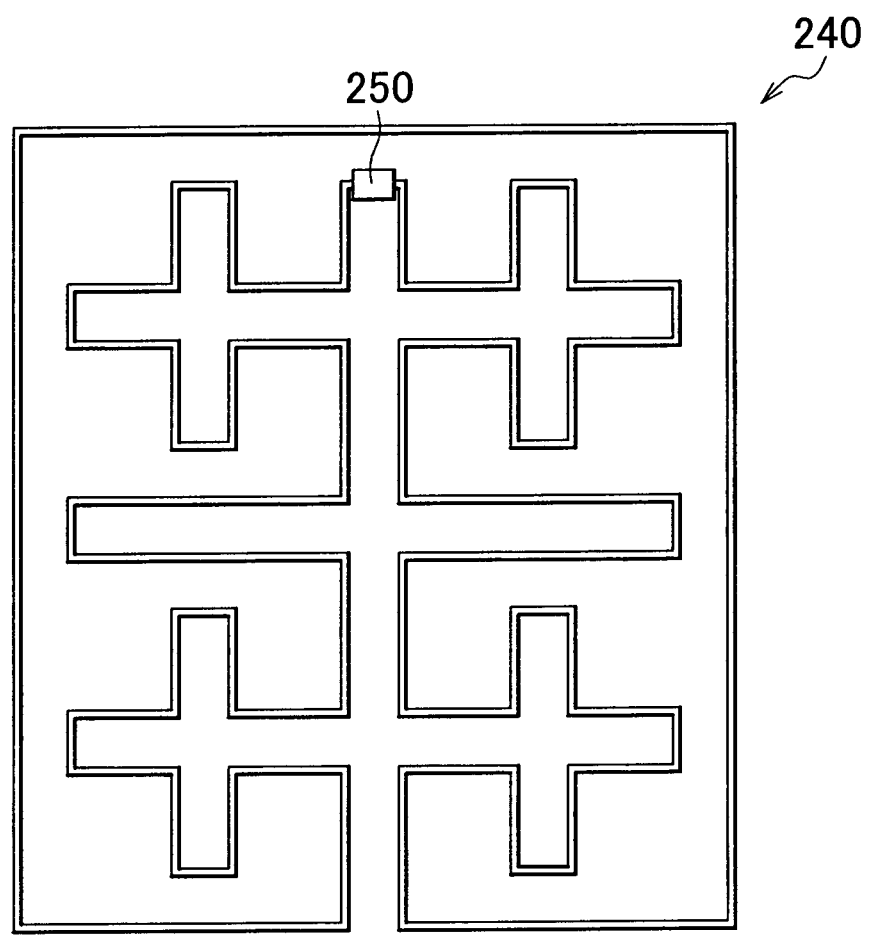
FIG. 11 is a plan view that shows the equipment-side resonance coil 240 according to the present embodiment.

FIG. 10 is a plan view that shows a manner when electric current flows through the vehicle-side resonance coil 110. In FIG. 10 and FIG. 11, the vehicle-side resonance coil 110 is formed with plural unit coils 70 through 85.

The unit coils 70, 71, 73, 75, 76, 77, 78, 79, 81, 83, 84, and 85 are formed with parts of the outer conductor section 10 and the inner conductor section 11 which surround the regions R10, R11, R13, R15, R17, R16, R18, R19, R21, R23, R24, and R25.

The unit coils 72, 74, 80, and 82 are formed with parts of the inner conductor section 11 which surround the regions R12, R14, R20, and R22.

As clearly seen from FIG. 10, when electric current flows through the vehicle-side resonance coil 110, it can be found that the directions of the magnetic fields which are formed by the unit coils 70 through 85 are consistent with each other.

FIG. 11 is a plan view that shows the equipment-side resonance coil 240 according to the present embodiment. As shown in FIG. 11, the equipment-side resonance coil 240 of the second embodiment is formed to be substantially the same shape as the vehicle-side resonance coil 110 shown in FIG. 9, for example.

According to the vehicle-side resonance coil 110 and the equipment-side resonance coil 240 that are formed as described above, if the vehicle-side resonance coil 110 and the equipment-side resonance coil 240 are misaligned, a large overlapping section between the vehicle-side resonance coil 110 and the equipment-side resonance coil 240 can be obtained, and therefore the decrease in the electric power transmission and receiving efficiencies can be prevented.

The first and the second embodiments have one inner conductor section 11; however, plural inner conductor sections 11 may be formed.

Figure 12:
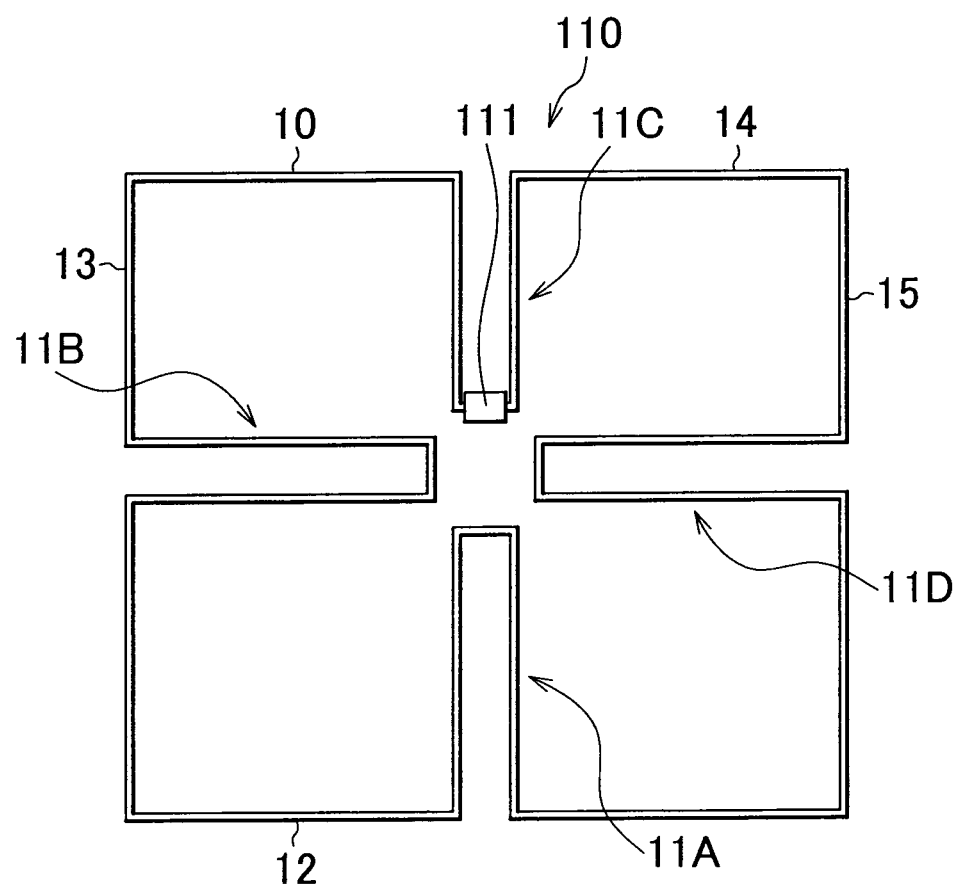
FIG. 12 is a plan view that shows a first modification of the vehicle-side resonance coil 110.

FIG. 12 is a plan view that shows a first modification of the vehicle-side resonance coil 110. As shown in FIG. 12, plural inner conductor sections 11A through 11D may be formed with a distance in the circumferential direction of the outer conductor section 10. In addition, respective inner conductor sections 11A through 11D may be provided with branch sections and projecting sections.

In the vehicle-side resonance coil 110 according to the second embodiment, although respective unit coils 70 through 85 are formed to substantially agree with each other in size, the sizes of the unit coils 70 through 85 may differ depending on the positions.

Figure 13:
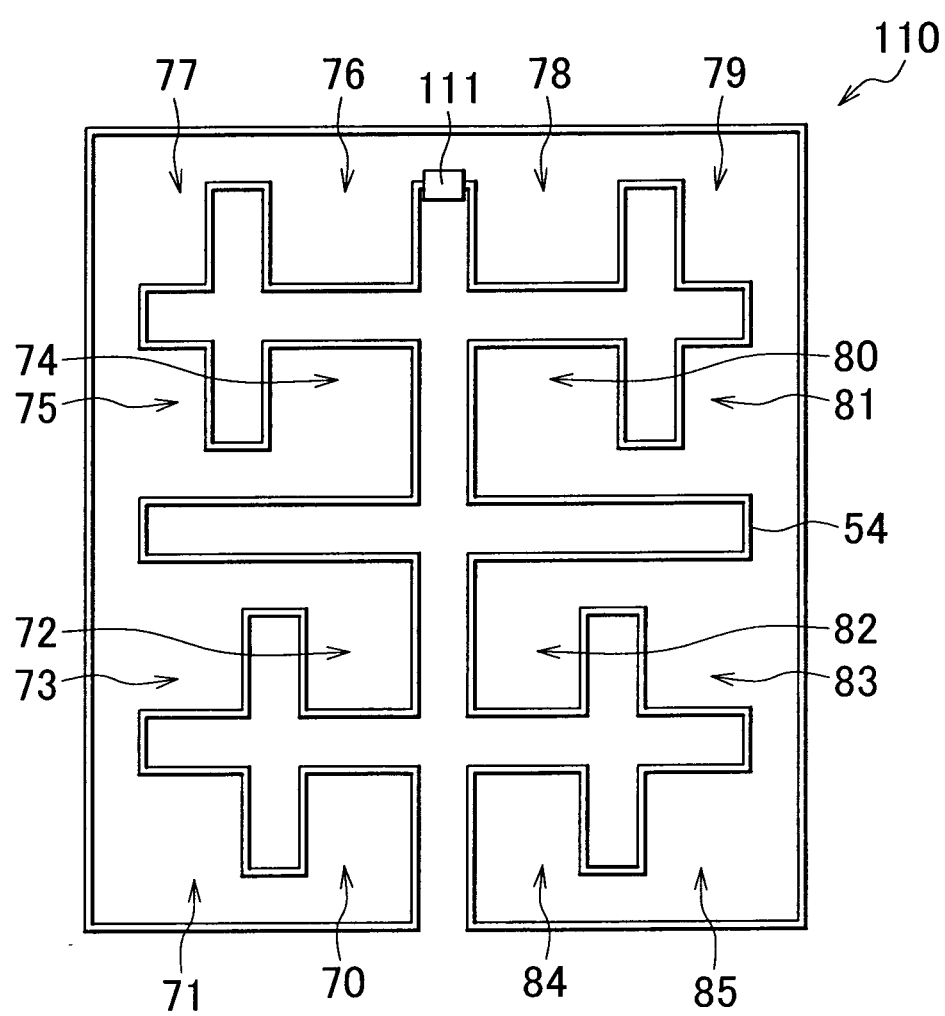
FIG. 13 is a plan view that shows a second modification of the vehicle-side resonance coil 110.

FIG. 13 is a plan view that shows a second modification of the vehicle-side resonance coil 110. In the modification shown in FIG. 13, the unit coils 74, 76, 78, and 81 are formed to be larger than other unit coils in size.

In the vehicle-side resonance coil 110 according to the first embodiment shown in FIG. 5 for example, the branch sections 21 and 22 that extend from the midsection in the length direction of the main section 20 toward a direction perpendicular to the main section 20 are formed; however, plural branch sections may be formed in addition to the branch sections 21 and 22.

Figure 14:
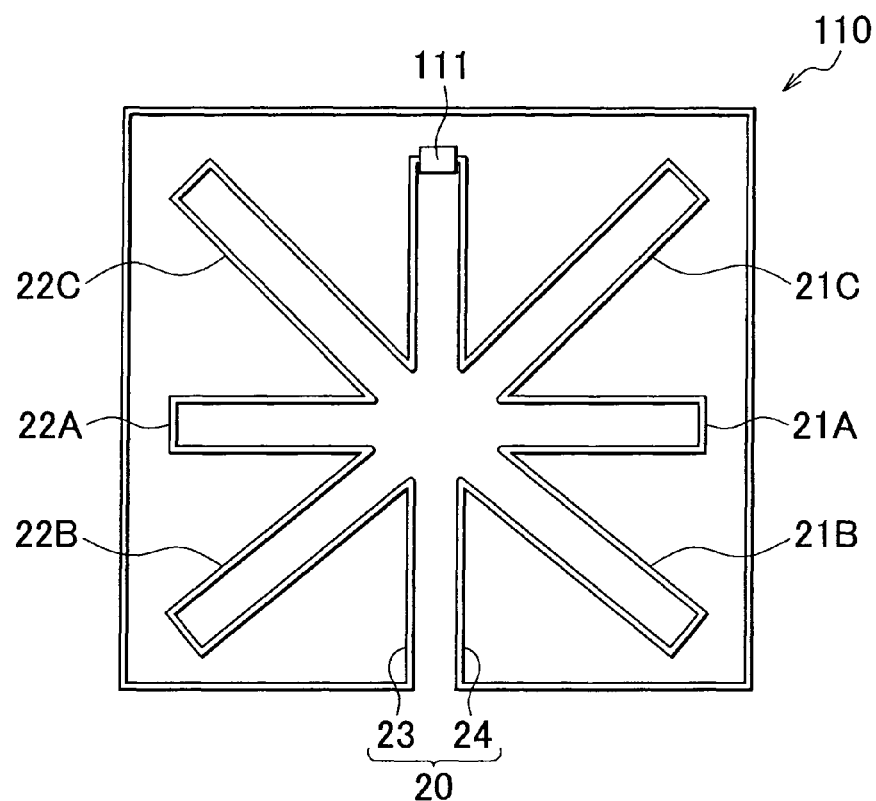
FIG. 14 is a plan view that shows a third modification of the vehicle-side resonance coil 110.

FIG. 14 is a plan view that shows a third modification of the vehicle-side resonance coil 110. As shown in FIG. 14, plural branch sections 21A through 21C and 22A through 22C may be formed radially.

Referring to FIG. 15 through FIG. 26, electric power transmission and receiving efficiencies when the electric power is transmitted and received with the vehicle-side resonance coils 110 and the equipment-side resonance coils 240 according to the first and the second embodiments and electric power transmission and receiving efficiencies when the electric power is transmitted and received with the vehicle-side self-resonance coil and the equipment-side self-resonance coil of comparative examples will be described.

Figure 15:
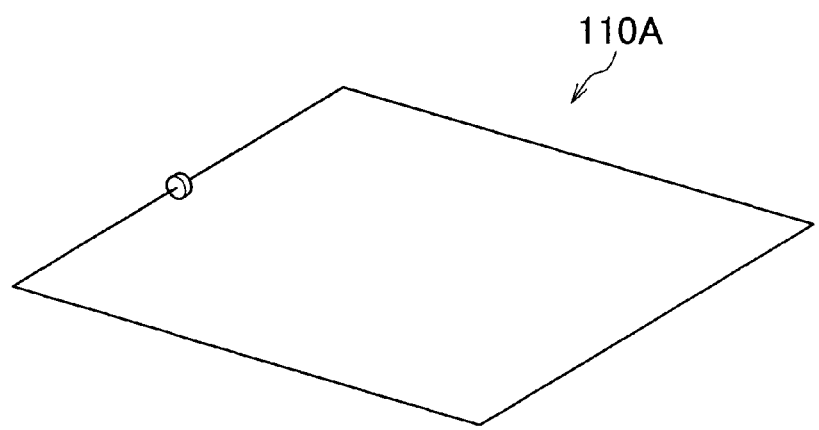
FIG. 15 is a perspective view that shows a resonance coil model 110A as a first comparative example.
Figure 16:
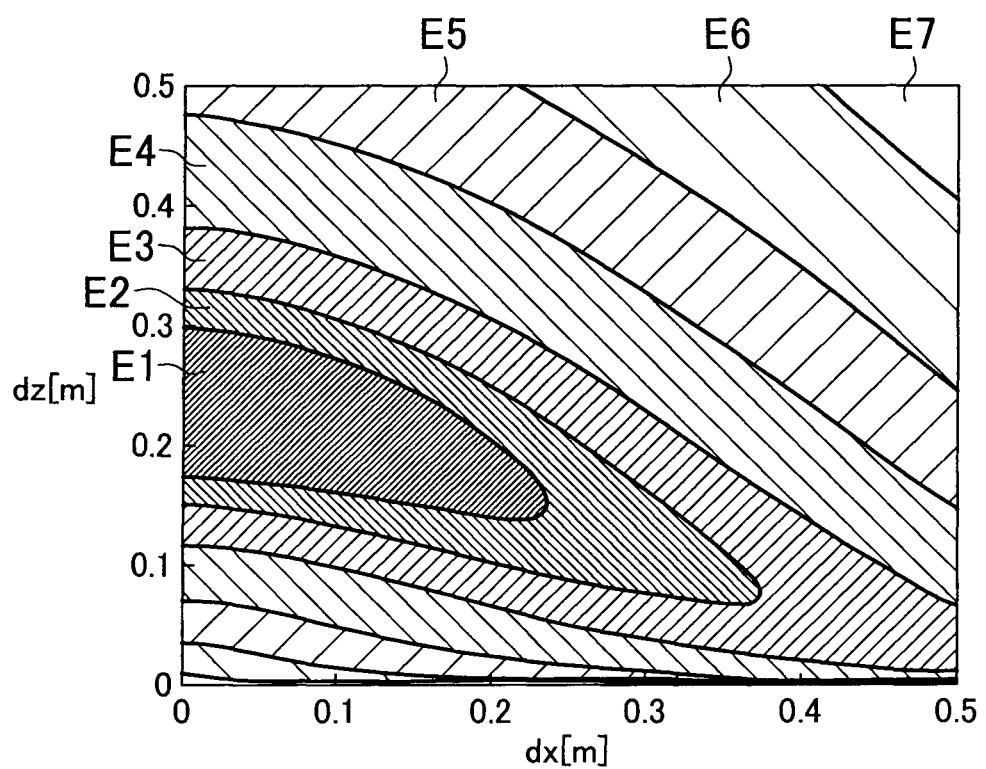
FIG. 16 is a graph that shows electric power transmission and receiving efficiencies when the electric power is transmitted and received with the resonance coil model 110A that is shown in FIG. 15.

FIG. 15 is a perspective view that shows a resonance coil model 110A as a first comparative example. The shape of the resonance coil model 110A is a square shape with a side of 1 m. With two resonance coil models 110A, a result of performing a simulation of electric power transmission and receiving efficiencies when the electric power is transmitted from one resonance coil model 110A to the other resonance coil model 110A is shown in FIG. 16. As simulation software, FEKO (three-dimensional electromagnetic field analysis simulator by EMSS) is adopted.

FIG. 16 is a graph that shows electric power transmission and receiving efficiencies when the electric power is transmitted and received with two resonance coil models 110A that are shown in FIG. 15.

In FIG. 16, the horizontal axis indicates relative misalignment amount dx (m) in the horizontal direction between the resonance coil models 110A and the equipment-side resonance coil 240A, and the vertical axis indicates relative misalignment amount dz (m) in the vertical direction. In FIG. 16, the origin (0, 0) indicates that the resonance coil models 110A and the equipment-side resonance coil 240A coincide.

Furthermore, efficiency regions E1 through E7 as shown in FIG. 16 denote electric power transmission and receiving efficiencies at respective positions. The efficiency region E1 indicates the region of the highest electric power transmission and receiving efficiencies. As the region shifts from the efficiency region E1 to the efficiency region E2, the efficiency region E3, the efficiency region E4, the efficiency region E5, the efficiency region E6, and the efficiency region E7 in the graph, the electric power transmission and receiving efficiency decreases. The efficiency region E7 indicates the region of the lowest electric power transmission and receiving efficiencies.

Figure 17:
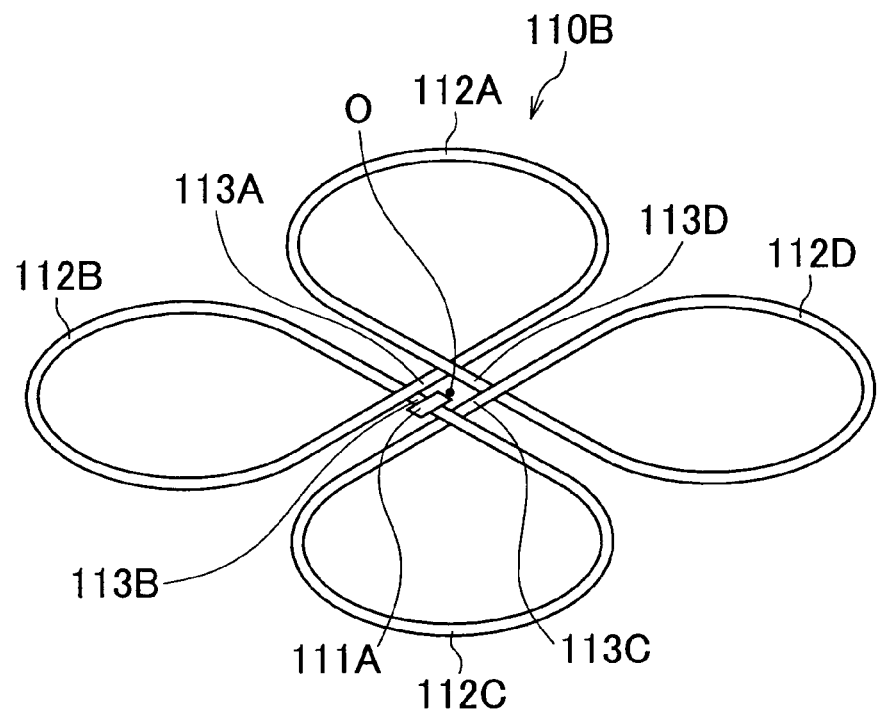
FIG. 17 is a perspective view that shows a resonance coil 110B as a second comparative example.

FIG. 17 is a perspective view that shows a resonance coil 110B as a second comparative example. The resonance coil 110B includes plural small coils 112A, 112B, 112C, and 112D, and the small coils 112A through 112D are arranged in a circular pattern around the winding center line O.

The resonance coil 110B includes connecting wires 113A through 113D that connect the small coils 112A through 112D adjacent to each other and a capacitor 111A that is connected to the connecting wire 113B. The connecting wires 113A through 113D are arranged in the vicinity of the winding center line O with respect to the small coils 112A through 112D. The connecting wire 113A passes over the connecting wire 113B, and the connecting wire 113B passes over the connecting wire 113C. The connecting wire 113C passes over the connecting wire 113D, and the connecting wire 113D passes over the connecting wire 113A.

Figure 18:
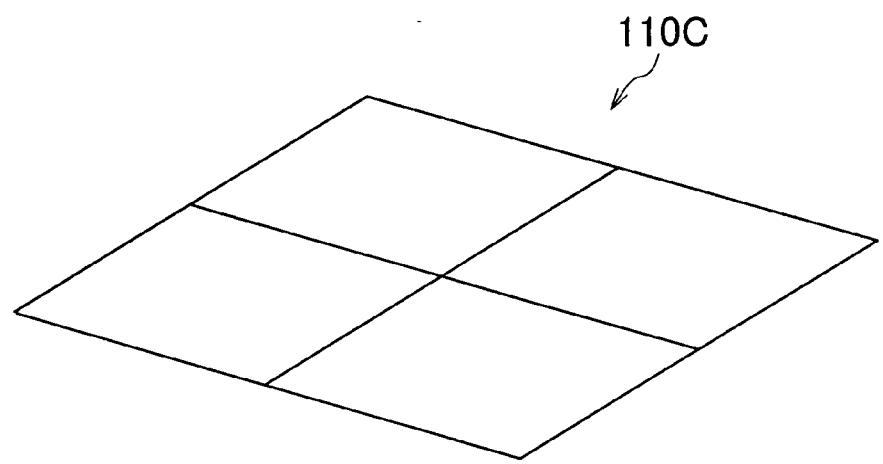
FIG. 18 is a perspective view of a resonance coil model 110C in which the resonance coil 110B as shown in FIG. 17 is modeled.

FIG. 18 is a perspective view of a resonance coil model 110C in which the resonance coil 110B as shown in FIG. 17 is modeled. The length of a side of the resonance coil model 110C is 1 m.

Figure 19:
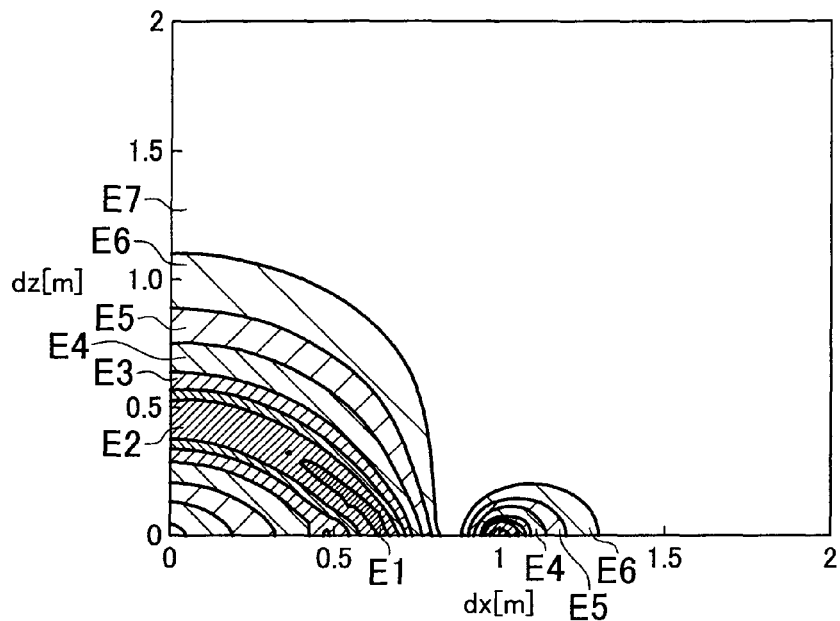
FIG. 19 is a graph that shows electric power transmission and receiving efficiencies when the electric power is transmitted and received with the resonance coil model 110C that is shown in FIG. 18.

With two resonance coil models 110C, a result of performing a simulation of electric power transmission and reception between one resonance coil model 110C and the other resonance coil model 110C is shown in FIG. 19.

In the graph shown in FIG. 19, the horizontal axis indicates relative misalignment amount dx (m) in the horizontal direction between the resonance coil models 110C, and the vertical axis indicates relative misalignment amount dz (m) in the vertical direction. The efficiency regions E1 through E7 shown in FIG. 19 correspond to the efficiency regions E1 through E7 shown in FIG. 16.

Figure 20:
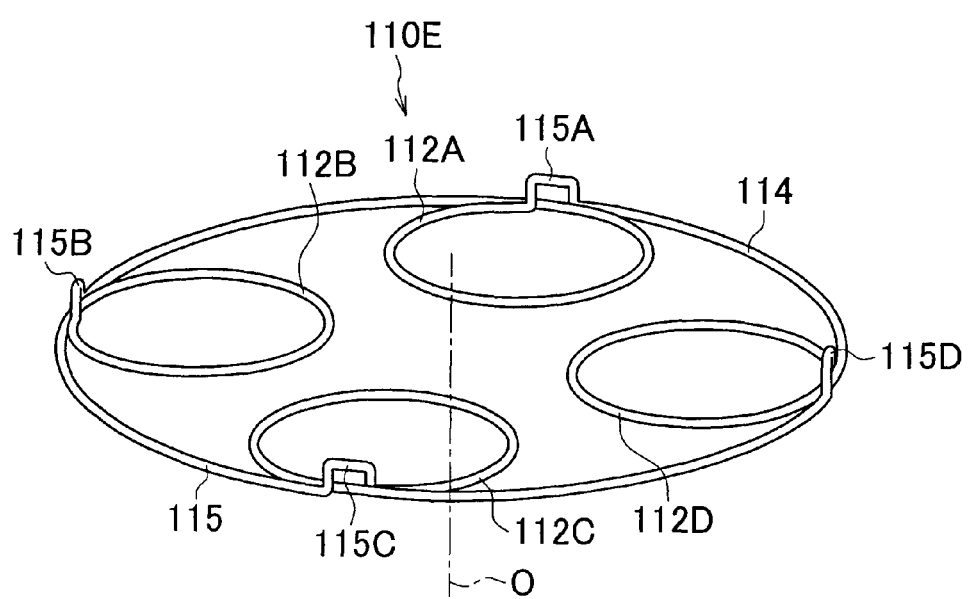
FIG. 20 is a perspective view that shows a resonance coil 110E as a third comparative example.

FIG. 20 is a perspective view that shows a resonance coil 110E as a third comparative example. The resonance coil 110E includes plural small coils 112A through 112D that are arranged around the winding center line O, an outer coil 114 that is arranged in an outer periphery of the small coils 112A through 112D, and plural connecting sections 115A, 115B, 115C, and 115D.

The connecting section 115A connects between the outer coil 114 and the small coil 112A, and the connecting section 115B connects between the outer coil 114 and the small coil 112B. The connecting section 115C connects between the outer coil 114 and the small coil 112C, and the connecting section 115D connects between the outer coil 114 and the small coil 112D. The connecting sections 115A, 115B, 115C, and 115D are formed to straddle the small coils 112A, 112B, 112C, and 112D, and the outer coil 114 and to have an upward curvature.

Figure 21:
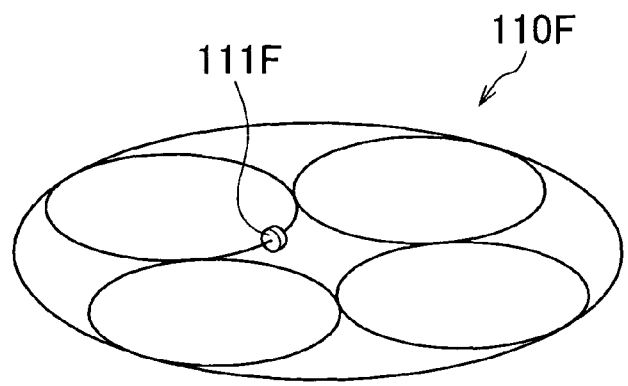
FIG. 21 is a perspective view that shows a resonance coil model 110F in which the resonance coil 110E as shown in FIG. 20 is modeled.

FIG. 21 is a perspective view that shows a resonance coil model 110F in which the resonance coil 110E as shown in FIG. 20 is modeled. The outer coil of the resonance coil model 110F is 1 m in diameter, and the resonance coil model 110F is provided with a capacitor 111F.

Figure 22:
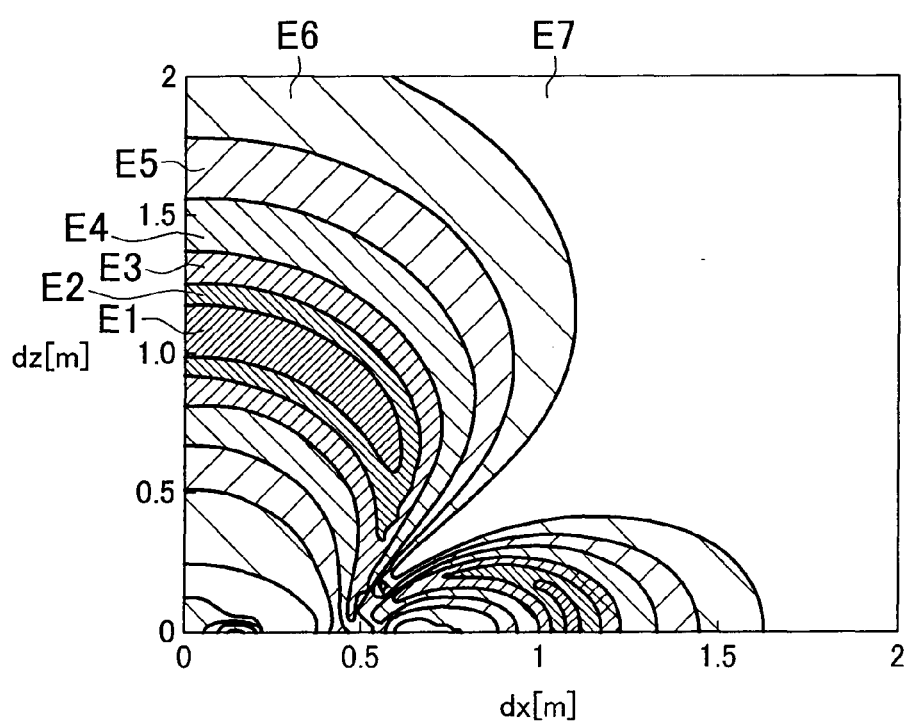
FIG. 22 is a graph that shows a result of performing a simulation of the electric power transmission and reception between two resonance coil models 110F.

With two resonance coil models 110F, a result of performing a simulation of electric power transmission and receiving efficiencies when the electric power is transmitted and received between one resonance coil model 110F and the other resonance coil model 110F is shown in FIG. 22. FIG. 22 is a graph that shows a result of performing a simulation of the electric power transmission and reception between two resonance coil models 110F. The efficiency regions E1 through E7 shown in FIG. 22 also correspond to the efficiency regions E1 through E7 shown in FIG. 16 and FIG. 19.

Figure 23:
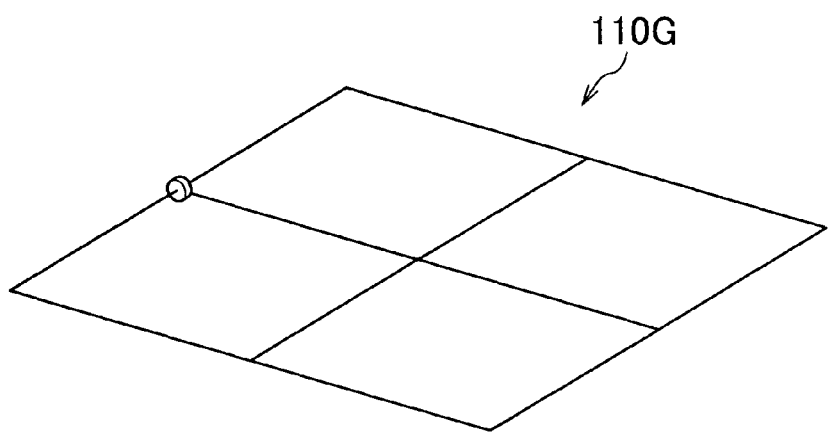
FIG. 23 is a perspective view that shows a resonance coil model 110G when the vehicle-side resonance coil 110 according to the first embodiment is modeled.

FIG. 23 is a perspective view that shows a resonance coil model 110G when the vehicle-side resonance coil 110 according to the first embodiment is modeled.

Figure 24:
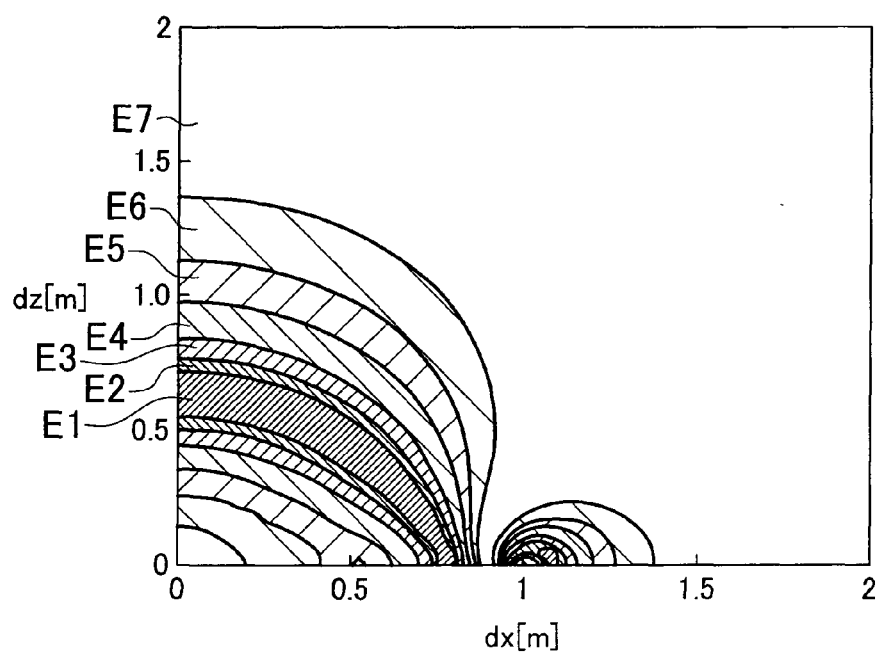
FIG. 24 is a graph that shows electric power transmission and receiving efficiencies when the electric power is transmitted and received with the resonance coil model 110G that is shown in FIG. 23.

In FIG. 23, the length of a side of the resonance coil model 110G is 1 m. With two resonance coil models 110E the electric power transmission and receiving efficiencies when the electric power is transmitted and received between one resonance coil model 110G and the other resonance coil model 110G are shown in FIG. 24. The efficiency regions E1 through E7 shown in FIG. 24 also correspond to the efficiency regions E1 through E7 shown in FIG. 16, FIG. 19, and FIG. 22.

Figure 25:
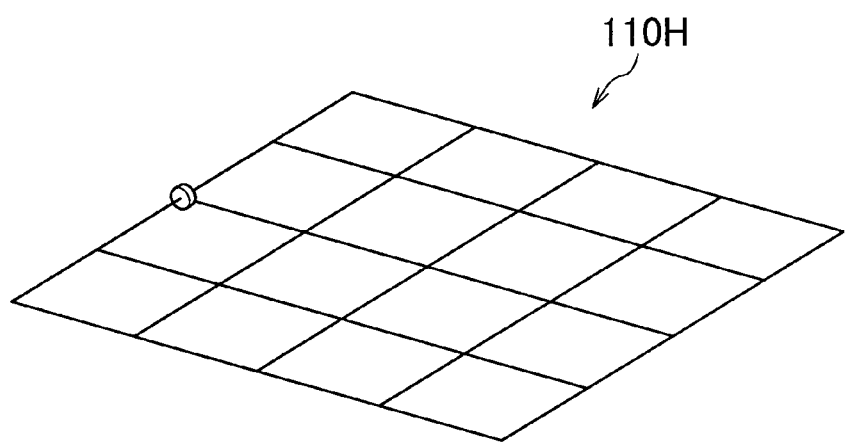
FIG. 25 is a perspective view that shows a resonance coil model 110H in which the vehicle-side resonance coil 110 as shown in FIG. 9 is modeled.
Figure 26:
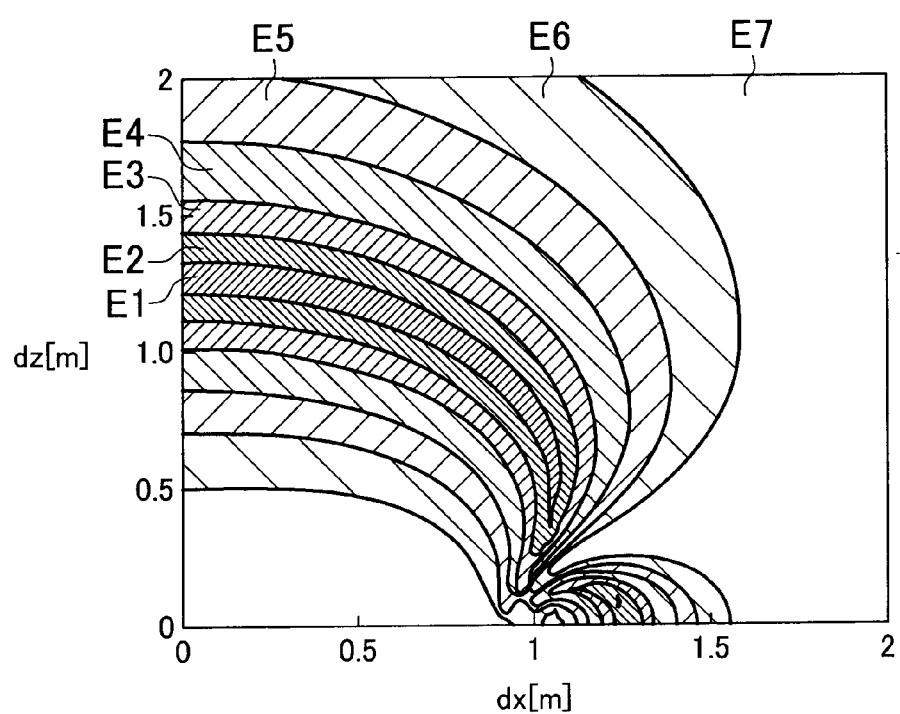
FIG. 26 is a graph that shows electric power transmission and receiving efficiencies when the electric power is transmitted and received with the resonance coil model 110H that is shown in FIG. 25.

FIG. 25 is a perspective view that shows a resonance coil model 110H in which the vehicle-side resonance coil 110 as shown in FIG. 9 is modeled. With two resonance coil models 110H, the electric power transmission and receiving efficiencies when the electric power is transmitted and received between one resonance coil model 110H and the other resonance coil model 110H are shown in FIG. 26.

In comparison with simulation result that are shown in FIG. 16, FIG. 19, FIG. 22, FIG. 24, and FIG. 26, it can be found that the resonance coil models 110C, 110F, 110G, and 110H have higher electric power transmission and receiving efficiencies than that of the resonance coil model 110A.

Furthermore, it can be found that the resonance coil models 110F, 110G, and 110H have higher electric power transmission and receiving efficiencies than that of the resonance coil model 110C.

It can be found also that the electric power transmission and receiving efficiencies of the resonance coil model 110O and the electric power transmission and receiving efficiencies of the resonance coil model 110F are approximately the same. In addition, it can be found that the resonance coil model 110H has the highest electric power transmission and receiving efficiencies.

As described above, according to the vehicle-side resonance coils 110 and the equipment-side resonance coils 240 according to the first and the second embodiments, it can be found that high electric power transmission and receiving efficiencies can be obtained. Furthermore, as described above, according to the vehicle-side resonance coils 110 and the equipment-side resonance coils 240 according to the first and the second embodiments, a reduction in thickness in the direction of the winding center line O can be achieved.

The embodiments disclosed herein are to be considered in all respects as illustrative and not restrictive. The scope of the present invention is indicated by the appended claims rather than by the foregoing description, and all changes which come within the meaning and range of equivalency of the claims are therefore intended to be embraced therein. In addition, the combination of the structures that are described in each embodiment is originally intended.

The present invention can be applied to a resonance coil, an electric power transmission device, an electric power receiving device, and an electric power transmission system.

The invention claimed is:
1. A resonance coil comprising:
a coil wire that forms a plurality of unit coils, each unit coil producing a magnetic field from current flowing therethrough, directions of each magnetic field produced by each unit coil being parallel to each other, the plurality of unit coils being arranged around a coil center line;
an outer conductor section that is formed with the coil wire, the outer conductor section extending to surround the coil center line and including a first connecting end and a second connecting end;
an inner conductor section that is formed with the coil wire and is arranged within a first region that is surrounded by the outer conductor section, the inner conductor section having a first end that is connected to the first connecting end and a second end that is connected to the second connecting end; and
a plurality of second regions formed in the first region that are each surrounded by a portion of the inner conductor section and a portion of the outer conductor section,
wherein when the resonance coil is seen in a direction of the coil center line, the coil wire is formed so as not to be overlapped, and each unit coil is formed with the portion of the outer conductor section and the portion of the inner conductor section that surround one of the plurality of second regions.

2. The resonance coil according to claim 1, wherein
the outer conductor section is formed by bending the coil wire, and
the inner conductor section is formed by bending the coil wire from the first connecting end and the second connecting end.

3. The resonance coil according to claim 1, wherein
an area which the plurality of second regions occupy is larger than an area of a third region that is surrounded by the first connecting end, the second connecting end, and the inner conductor section.

4. The resonance coil according to claim 1, wherein
the inner conductor section includes a main section that extends from the outer conductor section toward the coil center line, and
the main section extends to a vicinity of the outer conductor section so as to secure insulation properties with the outer conductor section and form the plurality of second regions.

5. The resonance coil according to claim 1, wherein
the inner conductor section includes a main section that extends from the outer conductor section toward the coil center line, and a branch section that extends to branch from the main section and that is formed with the coil wire.

6. The resonance coil according to claim 5, wherein
the outer conductor section includes a first side section in which the first connecting end and the second connecting end are formed, a second side section in which a first end is connected to a first end of the first side section, a third side section in which a first end is connected to a second end of the first side section, and a fourth side section that connects between a second end of the second side section and a second end of the third side section;
the main section extends from the first side section to the fourth side section, and
the inner conductor section includes a first branch section that extends from the main section to the second side section and a second branch section that extends from the main section to the third side section.

7. A resonance coil comprising:
a coil wire that forms a plurality of unit coils, each unit coil producing a magnetic field from current flowing therethrough, directions of each magnetic field produced by each unit coil being parallel to each other, the plurality of unit coils being arranged around a coil center line;
an outer conductor section that is formed with the coil wire, the outer conductor section extending to surround the coil center line and including a first connecting end and a second connecting end;
an inner conductor section that is formed with the coil wire and is arranged within a first region that is surrounded by the outer conductor section, the inner conductor section having a first end that is connected to the first connecting end; end that is connected to the second connecting end;
a plurality of second regions formed in the first region that are each surrounded by a portion of the inner conductor section and a portion of the outer conductor section;
a third region that is surrounded by the first connecting section, the second connecting section, and the inner conductor section; and
a plurality of fourth regions that are regions other than the third region and that are surrounded by the inner conductor section,
wherein when the resonance coil is seen in a direction of the coil center line, the coil wire is formed so as not to be overlapped, and each unit coil is formed with the portion of the inner conductor section and the portion of the outer conductor section that surround one of the plurality of second regions, or a portion of the inner conductor section that surrounds one of the plurality of fourth regions.

8. The resonance coil according to claim 7, wherein
an area that the plurality of second regions and the plurality of fourth regions occupy is larger than an area that the third region occupies.

9. The resonance coil according to claim 7, wherein
the inner conductor section includes a main section that extends from the outer conductor section toward the coil center line, a branch section that is formed to branch from the main section, and a projecting section that is formed to project from a midsection of the branch section in a length direction.

10. The resonance coil according to claim 1, wherein
the inner conductor section is plurally formed with a distance in an extending direction of the outer conductor section.

11. The resonance coil according to claim 1, wherein
the coil wire is positioned on an imaginary plane.

12. An electric power transmission device, comprising:
the resonance coil according to claim 1 for electric power transmission that is coupled to a resonance coil for electric power reception that is provided in an electric power receiving device through electromagnetic resonant coupling; and
a coil that is supplied with electric power from an external power supply and that supplies electric power to the resonance coil for electric power transmission through electromagnetic induction.

13. An electric power receiving device, comprising:
the resonance coil according to claim 1 for electric power reception that is coupled to a resonance coil for electric power transmission that is provided in an electric power transmission device through electromagnetic resonant coupling; and
a coil that receives electric power from the resonance coil for electric power reception through electromagnetic induction.

14. An electric power transmission system, comprising:
the electric power transmission device according to claim 12; and
an electric power receiving device including:
the resonance coil for electric power reception including a coil wire that forms a plurality of unit coils, each unit coil producing a magnetic field from current flowing therethrough, directions of each magnetic field produced by each unit coil being parallel to each other, the plurality of unit coils being arranged around a coil center line; and
a coil that receives electric power from the resonance coil for electric power reception through electromagnetic induction,
wherein when the resonance coil for electric power reception is seen in a direction of its coil center line, the resonance coil for electric power reception is formed so as not to be overlapped.

15. The resonance coil according to claim 1, wherein the plurality of unit coils is formed continuously.

* * * * *